US010252798B2

(12) United States Patent
Petrov

(10) Patent No.: US 10,252,798 B2
(45) Date of Patent: Apr. 9, 2019

(54) VERTICAL TAKEOFF AND LANDING AIRFRAME

(71) Applicant: Val Petrov, Brookline, MA (US)

(72) Inventor: Val Petrov, Brookline, MA (US)

(73) Assignee: PteroDynamics, Moorpark, CA (US)

(*) Notice: Subject to any disclaimer, the term of this patent is extended or adjusted under 35 U.S.C. 154(b) by 0 days.

(21) Appl. No.: 15/848,705

(22) Filed: Dec. 20, 2017

(65) Prior Publication Data

US 2018/0312251 A1 Nov. 1, 2018

Related U.S. Application Data

(60) Provisional application No. 62/490,814, filed on Apr. 27, 2017.

(51) Int. Cl.
*B64C 3/38* (2006.01)
*B64C 3/42* (2006.01)
*B64C 25/34* (2006.01)
*B64C 25/54* (2006.01)
*B64D 27/12* (2006.01)
(Continued)

(52) U.S. Cl.
CPC ............ *B64C 29/0033* (2013.01); *B64C 3/38* (2013.01); *B64C 3/42* (2013.01); *B64C 25/34* (2013.01); *B64C 25/54* (2013.01); *B64D 27/12* (2013.01); *B64D 27/24* (2013.01)

(58) Field of Classification Search
CPC .. B64C 3/38; B64C 3/385; B64C 3/40; B64C 3/42; B64C 3/56; B64C 29/0033; B64C 29/0075
See application file for complete search history.

(56) References Cited

U.S. PATENT DOCUMENTS

| 1,556,414 A | 10/1925 | Bumpus |
| 1,793,056 A | 2/1931 | Carns |
| 1,846,992 A | 2/1932 | Decker |

(Continued)

FOREIGN PATENT DOCUMENTS

| DE | 907502 C | * 3/1954 | ............... B64C 3/42 |
| WO | 2014177589 A1 | 11/2014 | |

OTHER PUBLICATIONS

"DZYNE Creates a New Approach to Vertical Takeoff and Landing (VTOL): Rotate the Wings", May 14, 2015, Design World. Accessed on YouTube Jan. 29, 2019 at https://youtu.be/-cCoPBGq-iA (Year: 2015).*

(Continued)

*Primary Examiner* — Richard R. Green
(74) *Attorney, Agent, or Firm* — The Webb Law Firm

(57) ABSTRACT

Airframes configured for stable in-flight transition between forward flight and vertical takeoff and landing are described herein. In one embodiment, an aircraft can include a fuselage, opposed wings extending from opposed sides of the fuselage, and a plurality of engines. At least one engine can be mounted to each of the opposed wings and at least a portion of each opposed wing including at least one of the plurality of engines can rotate relative to the fuselage around a rotation axis that is non-perpendicular and transverse to a longitudinal axis of the fuselage. Rotating portions of the wings including at least one of the plurality of engines in the described manner can provide a stable and smooth transition between vertical and forward flight.

30 Claims, 27 Drawing Sheets

(51) Int. Cl.
   *B64D 27/24* (2006.01)
   *B64C 29/00* (2006.01)

(56) References Cited

U.S. PATENT DOCUMENTS

| | | | |
|---|---|---|---|
| 1,848,389 A | 3/1932 | Sikorsky | |
| 2,572,421 A * | 10/1951 | Abel, Jr. | B64C 3/56 244/49 |
| 2,674,422 A | 4/1954 | Pellarini | |
| 3,081,964 A | 3/1963 | Quenzler | |
| 3,179,354 A | 4/1965 | Alvarez-Calderon | |
| 3,231,221 A | 1/1966 | Platt | |
| 3,246,861 A | 4/1966 | Curci | |
| 3,439,890 A | 4/1969 | Stits | |
| 3,519,224 A | 7/1970 | Boyd et al. | |
| 3,666,209 A | 5/1972 | Taylor | |
| 3,937,424 A | 2/1976 | Meier et al. | |
| 5,094,412 A | 3/1992 | Narramore | |
| 5,192,037 A | 3/1993 | Moorefield | |
| 5,405,105 A | 4/1995 | Kress | |
| 5,407,150 A | 4/1995 | Sadleir | |
| 5,765,783 A | 6/1998 | Albion | |
| 5,839,691 A | 11/1998 | Lariviere | |
| 8,157,206 B2 | 4/2012 | Gionta et al. | |
| 8,800,912 B2 | 8/2014 | Oliver | |
| 9,259,984 B2 | 2/2016 | Brown | |
| 9,550,567 B1 | 1/2017 | Erdozain, Jr. et al. | |
| 9,676,488 B2 | 6/2017 | Alber | |
| 9,682,774 B2 | 6/2017 | Paduano et al. | |
| 9,714,090 B2 | 7/2017 | Frolov et al. | |
| 9,731,818 B2 | 8/2017 | Dekel et al. | |
| 9,821,909 B2 | 11/2017 | Moshe | |
| 2010/0171001 A1 | 7/2010 | Karem | |
| 2011/0042507 A1 | 2/2011 | Seiford, Sr. | |
| 2013/0008997 A1 | 1/2013 | Gentile | |
| 2014/0117150 A1 | 5/2014 | Good et al. | |
| 2015/0225071 A1 | 8/2015 | Tighe | |
| 2015/0266571 A1 | 9/2015 | Bevirt et al. | |
| 2015/0375860 A1 | 12/2015 | Hong et al. | |
| 2016/0023527 A1 * | 1/2016 | Dietrich | B64C 3/56 244/2 |
| 2016/0185444 A1 | 6/2016 | Gionta et al. | |
| 2016/0378120 A1 | 12/2016 | Creasman | |
| 2017/0008625 A1 | 1/2017 | Olm et al. | |
| 2017/0072755 A1 | 3/2017 | Zhou et al. | |
| 2017/0190412 A1 | 7/2017 | Bunting et al. | |
| 2017/0217594 A1 | 8/2017 | Bacon et al. | |
| 2017/0217596 A1 | 8/2017 | Bacon et al. | |
| 2017/0217597 A1 | 8/2017 | Bacon et al. | |
| 2017/0217598 A1 | 8/2017 | Bacon et al. | |

OTHER PUBLICATIONS

Michelhaugh, T. M., et al., "Wing-folding mechanism of the Grumman Wildcat," Amer. Soc. Mech. Eng. Brochure, <https://www.asme.org/getmedia/2d64abc8-3fa3-4d29-92d4-40db4777e8b2/238-grumman-wildcat-sto-wing-wing-folding-mechanism.aspx.>, May 15, 2006.

Design World. "DZYNE Creates a New Approach to Vertical Takeoff and Landing (VTOL): Rotate the Wings." YouTube, May 14, 2015, https://www.youtube.com/watch?v=cCoPBGq-iA&feature=youtu.be, accessed on Jan. 28, 2019.

* cited by examiner

VERTICAL TAKEOFF AND LANDING AIRFRAME

CROSS-REFERENCE TO RELATED APPLICATIONS

This application claims the benefit of U.S. Provisional Application No. 62/490,814, filed Apr. 27, 2017, which is hereby incorporated by reference in its entirety.

FIELD OF INVENTION

This disclosure relates to the fields of aircraft and aerial vehicles. More particularly, this disclosure relates to an airframe capable of vertical takeoff and landing with engines mounted on rotatable wings.

BACKGROUND

Airframes with high aspect ratio fixed wings, e.g., wings rigidly attached to a fuselage wherein a laterally extending length, or span, of the wing is much greater than a distance between its leading and trailing edges, or chord, can be reliable and efficient in forward flight. These airframes can have several disadvantages as well, including difficulty maneuvering at slow speeds and the need for runway or other runout for takeoff and landing. Prior attempts to address these issues have included airframes with tilting nacelles that house motors, engines, or other thrust producing components to better control an aircraft at slow speeds and allow for short takeoff and landing (STOL) or vertical takeoff and landing (VTOL) operation. In such configurations, however, high aspect ratio fixed wings can be detrimental. For example, long fixed wings can be difficult to maneuver during STOL or VTOL operation due to a large moment of inertia created by their mass being extended away from a center of gravity of the aircraft. Further, there can be significant aerodynamic drag from moving a wing in a manner that presents its largest surface area as a leading edge. Vertically-oriented wind gusts, such as downdrafts, etc., can also have significant impacts on long, fixed wings.

Other prior attempts to address issues with high aspect ratio fixed wing airframes have included tilting an entire wing assembly including engines or other thrust producing components about a span axis extending between wingtips. While such designs can aid in alleviating the above-described aerodynamic losses from moving a wing in a direction substantially normal to its intended angle of attack, they can still be difficult to maneuver due to the large moment of inertia of the extended wings. Further, the tilted wings can be impacted by horizontally-oriented wind gusts against the tilted surface area of the wings.

Prior configurations of both tilt-engine and tilt-wing airframes that can achieve STOL or VTOL operation also suffer from instability during transition from takeoff or landing configurations to forward flight configurations. Accordingly, such aircraft often exhibit bimodal operation envelopes and cannot stably or indefinitely operate at any speed between the takeoff or landing realm and the high-speed forward flight realm.

A further disadvantage of high aspect ratio fixed wing airframes is the need for substantial storage space at rest and substantial clearance during ground transport. Prior attempts to address these issues have included a variety of wing folding and tilting mechanisms. These mechanisms, however, are often tailored to ground storage or transport and are not operable during flight to enable, for example, vertical takeoff and landing, etc.

Accordingly, there is a need for improved airframes that provide efficient forward flight as well as vertical takeoff and landing. There is also a need for improved airframes that can smoothly and stably transition between such modes of operation.

SUMMARY OF THE INVENTION

The present disclosure generally provides airframes that address the shortcomings of prior attempts and enable efficient forward flight along with vertical takeoff and landing. Generally speaking, the embodiments described herein can achieve such versatile performance by employing a unique configuration of tilting wings and propulsion units that enable a large flight envelope encompassing both hovering and forward flight at a range of speeds.

The airframes described herein can perform repeated in-flight transformations between a compact and maneuverable hovering or slow speed configuration (e.g., similar to a multirotor drone, helicopter, or other hovering aircraft) and a lifting wing configuration capable of efficient horizontal flight (e.g., similar to a fixed wing aircraft). In the hovering or slow speed configuration, the weight of an aircraft can be substantially supported by the thrust of its propulsion units, which can be coupled to the tilting wings such that they are also tilted to direct their thrust more vertically. In the forward flight configuration, the weight of the aircraft can be substantially supported by the lift generated from the wings and the propulsion thrust can be directed more horizontally. Further, a continuous range of intermediate tilting positions can also be employed to provide varying levels of thrust- or wing-developed lifting force. The airframes disclosed herein provide a unique ability to smoothly and stably transition between these two operating modes in-flight and/or operate indefinitely in an intermediate mode.

These performance characteristics can, in some embodiments, be achieved by utilizing a folding wing structure that pivots on a slanted axis, i.e., an axis that is oblique to a longitudinal or lateral axis of the aircraft. Such a folding motion can orient a leading edge of each wing in an upward or forward direction, depending on the tilt of the wing. Further, in a tilted configuration the wings can extend along the fuselage of the aircraft to reduce the moment of inertia created by their mass, their aerodynamic impact during hover, as well as space required for storage or ground transport. Further, in some embodiments a portion of the wings folded in this manner can include propulsion units coupled thereto such that thrust can be redirected between a horizontal and a vertical direction as the wings are tilted or folded.

The airframe designs described herein can be embodied at any of a variety of scales. For example, the designs can be suitable for application in a small aircraft, such as a drone or remote-control aircraft, as well as full scale aircraft capable of transporting persons and cargo. And a variety of propulsion technologies can be employed, including electric motors, internal combustion engines, turbines, etc.

In one aspect, an aircraft is provided that can include a fuselage, opposed wings extending from opposed sides of the fuselage, and a plurality of engines. At least one engine can be mounted to each of the opposed wings. Further, at least a portion of each opposed wing including at least one of the plurality of engines can rotate relative to the fuselage around a rotation axis that is non-perpendicular and transverse to a longitudinal axis of the fuselage.

Each of the embodiments described herein can have a number of additional features and/or variations, all of which are within the scope of the present disclosure. In some embodiments, for example, a first angle between the rotation axis and the longitudinal axis of the fuselage projected in a plane containing the longitudinal axis of the fuselage and an axis extending between ends of the opposed wings can be between about 35° and about 55°. In some embodiments, the first angle can be about 45°. Further, in some embodiments a second angle between the rotation axis and the axis extending between ends of the opposed wings projected in a plane containing the axis extending between ends of the opposed wings and perpendicular to the longitudinal axis of the fuselage is between about 35° and about 55°. In some embodiments, the second angle can be about 45°.

In certain embodiments, the plurality of engines can include at least 4 engines and each portion of the opposed wings that rotates relative to the fuselage can include at least two engines mounted thereto. Any of a variety of engine types can be utilized. For example, in some embodiments each of the plurality of engines can be an electric engine. Moreover, in such embodiments the aircraft can further include a plurality of batteries and each battery can be mounted to one of the opposed wings adjacent to one of the plurality of engines. In other embodiments, each of the plurality of engines can be any of a turbine and an internal combustion engine.

In some embodiments, each of the opposed wings can include a fixed portion extending from the fuselage and a rotating portion outboard of the fixed portion. Further, in some embodiments an outboard end of each fixed portion can be oblique to the longitudinal axis of the fuselage. In some embodiments, each rotating portion of the opposed wings can rotate between a first configuration, in which an axis between a leading edge and a trailing edge of the wing is parallel to the longitudinal axis of the fuselage, and a second configuration, in which the axis between the leading edge and the trailing edge of the wing is perpendicular to the longitudinal axis of the fuselage. Further, in some embodiments the leading edge of each rotating portion of the opposed wings can face upward when the wings are in the second configuration.

Still further, in certain embodiments each rotating portion of the opposed wings can rotate between a first configuration, in which an axis extending between an inboard end to an outboard end of the rotating portion is perpendicular to the longitudinal axis of the fuselage, and a second configuration, in which the axis extending between the inboard end and the outboard end of the rotating portion is parallel to the longitudinal axis of the fuselage. As noted similarly above, in some embodiments the leading edge of each rotating portion of the opposed wings can face upward when the wings are in the second configuration. Still further, in some embodiments each of the plurality of engines can be offset from the wing it is mounted to such that, when each wing is in the first configuration, the at least one engine mounted thereto can be disposed between the wing and the fuselage.

In certain embodiments, the aircraft can further include at least one landing support coupled to a trailing portion of each rotating portion of the opposed wings. The landing support can have any of a variety of forms. For example, in some embodiments the landing support can be any of a wheel, a float, and a leg. In certain embodiments, the landing support can be a wheel coupled to one of the engines such that the engine can rotate the wheel.

A variety of mechanisms can be employed to provide for movement of the rotating portion relative to the fixed portion of each of the opposed wings. For example, in some embodiments the fixed portion and the rotating portion of each of the opposed wings can be coupled by a pivot joint. Further, in some embodiments the pivot joint can be disposed in a leading portion of each opposed wing. In certain embodiments, each of the opposed wings can further include an actuator to control rotation of the rotating portion relative to the fixed portion. In some embodiments, the actuator can include a lead screw coupled to the rotating portion by a linkage. In other embodiments, the actuator can include any of a variety of gears, hydraulic actuators, electric actuators, etc.

The opposed wings of the aircraft can have a variety of shapes and sizes. In some embodiments, for example, the opposed wings can have an airfoil shape. Such wings can produce lift during forward flight of the aircraft. In other embodiments, however, the wings can have alternative shapes. For example, in some embodiments the wings can be spars that do not produce lift. Examples can include cylindrical spars, beam spars, etc.

In another aspect, a vertical take-off or landing method is provided that can include rotating at least a portion of a wing having an engine mounted thereto relative to a fuselage around a rotation axis that is non-perpendicular and transverse to a longitudinal axis of the fuselage to orient the engine and a leading edge of the wing vertically for hovering. The method can further include actuating the engine to produce vertical lift, and rotating the at least portion of the wing having the engine mounted thereto to orient the engine and a leading edge of the wing horizontally for forward flight.

As with the aircraft described above, a number of variations and additional features are possible. For example, in some embodiments a leading edge of the wing can face upward when the wing is oriented vertically.

In certain embodiments, rotating the at least portion of the wing to orient the engine and the leading edge of the wing vertically can include pivoting the at least portion of the wing about a pivot joint disposed in a leading portion of the wing. Rotation of the at least portion of the wing can be accomplished in a variety of manners. For example, in some embodiments rotating the at least portion of the wing to orient the engine and the leading edge of the wing vertically can include any of hydraulically and electrically actuating such rotation.

In certain embodiments, the method can further include pausing rotation of the at least portion of the wing such that the wing and the engine are between a vertical and a horizontal orientation to transition between hovering and forward flight.

Any of the features or variations described above can be applied to any particular aspect or embodiment of the invention in a number of different combinations. The absence of explicit recitation of any particular combination is due solely to the avoidance of repetition in this summary.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION OF THE INVENTION

Figure 1:
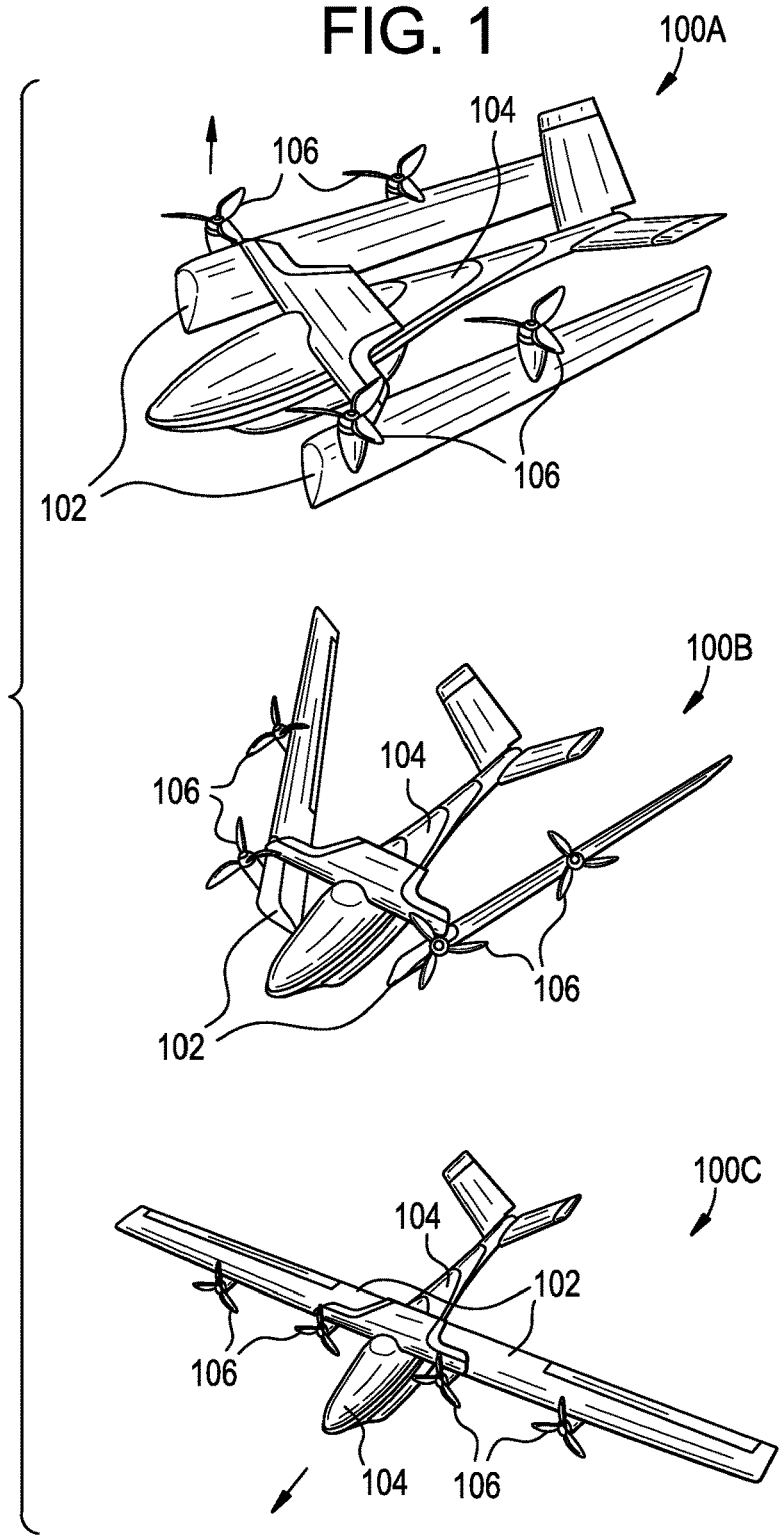
FIG. 1 shows a schematic of different wing configurations of an airframe according to the teachings provided herein.

Certain exemplary embodiments will now be described to provide an overall understanding of the principles of the structure, function, manufacture, and use of the airframes disclosed herein. One or more examples of these embodiments are illustrated in the accompanying drawings. Those skilled in the art will understand that the embodiments specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Additionally, to the extent that linear, circular, or other dimensions are used in the description of the disclosed embodiments, such dimensions are not intended to limit the types of shapes that can be utilized. A person skilled in the art will recognize that an equivalent to such linear, circular, or other dimensions can easily be determined for any geometric shape. Further, in the present disclosure, like-numbered components of the embodiments generally have similar features. Still further, sizes and shapes of overall structures, and the components thereof, can vary greatly and depend at least on the intended application, the size and shape of various other interacting components, etc. As noted above, the airframes described herein are expressly contemplated for use at a variety of size scales, e.g., in small-scale unmanned drones or remote-control aircraft and in large-scale aircraft capable of transporting persons and/or cargo. Finally, to the extent that terms of direction, e.g., vertical, horizontal, etc. are utilized, they are meant to convey relative relationships among components or nominal operating directions. It is possible that in certain configurations and/or maneuvers, the airframes described herein can be oriented such that, e.g., a referenced "vertical" surface might actually be at a different angle relative to gravity, etc.

As noted above, the present disclosure includes various embodiments of airframes capable of efficient forward flight, as well as slow speed maneuvering and hovering to achieve vertical takeoff and landing (VTOL). In some embodiments, the airframes described herein can include a fuselage, such as a single elongate fuselage that can extend substantially horizontally during cruising flight. The fuselage can include opposed wings extending therefrom, and each wing can include an inner fixed portion and an outer folding or tilting portion. The outer portion of each wing can be configured to pivot, fold, or tilt relative to the inner portion about an axis that is slanted or oblique to a longitudinal and/or lateral axis of the aircraft, such as a longitudinal axis of the elongate fuselage or a laterally extending axis perpendicular thereto. The wing area of each inner wing portion can be relatively small to allow vertically-directed airflow without significant drag force during hovering flight. Conversely, the outer portions of each wing can have larger wing areas, but can be configured to be tilted such that a leading edge thereof faces vertically upward during hovering flight and faces horizontally forward during forward flight. The outer portion of each wing can carry one or more propulsion units or thrust producing components such that these can also be moved between a vertical orientation during hovering flight and a horizontal orientation during forward flight. The outer portions of each wing can represent a significant portion of the wing assembly and/or aircraft weight and, when in a forward flight configuration, the outer wing portion can merge with the inner wing portion to create an uninterrupted wing surface.

FIG. 1 illustrates a schematic representation of one embodiment of an airframe according to the teachings of the present disclosure in its various modes of operation. Airframe 100A, for example, is illustrated in a hovering, slow speed maneuvering, and VTOL-capable configuration. In such a configuration, the wings 102 have been tilted relative to the fuselage 104 such that they extend parallel to a length of the fuselage and such that a leading edge thereof faces vertically upward or toward an upper surface of the airframe. In this configuration, the various thrust producing components 106 coupled to the wings 102 are also oriented vertically and can function similarly to the four motors of a quadcopter drone to allow stable hovering flight and relatively slow speed maneuvering in any direction.

From the hovering configuration shown by airframe 100A, the wings 102 can be tilted as shown by the airframe 100B to begin a transition to the forward flight configuration shown by the airframe 100C. The novel tilting design of the wings 102 and thrust producing components 106 can allow a seamless, aerodynamically benign transition from the hovering configuration 100A to the typical forward flight configuration 100C wherein the wings 102 are fully deployed with a leading edge thereof facing horizontally forward. In the forward flight configuration, the wings generate lift to support the weight of the airframe and extended flight range can be achieved through fast and aerodynamically efficient flight. Further, the transition between configurations can proceed in any direction and can be indefinitely paused at any intermediate step between the hover configuration 100A and the forward flight configuration 100C to enable varying degrees of maneuverability and flight speed.

Figure 2:
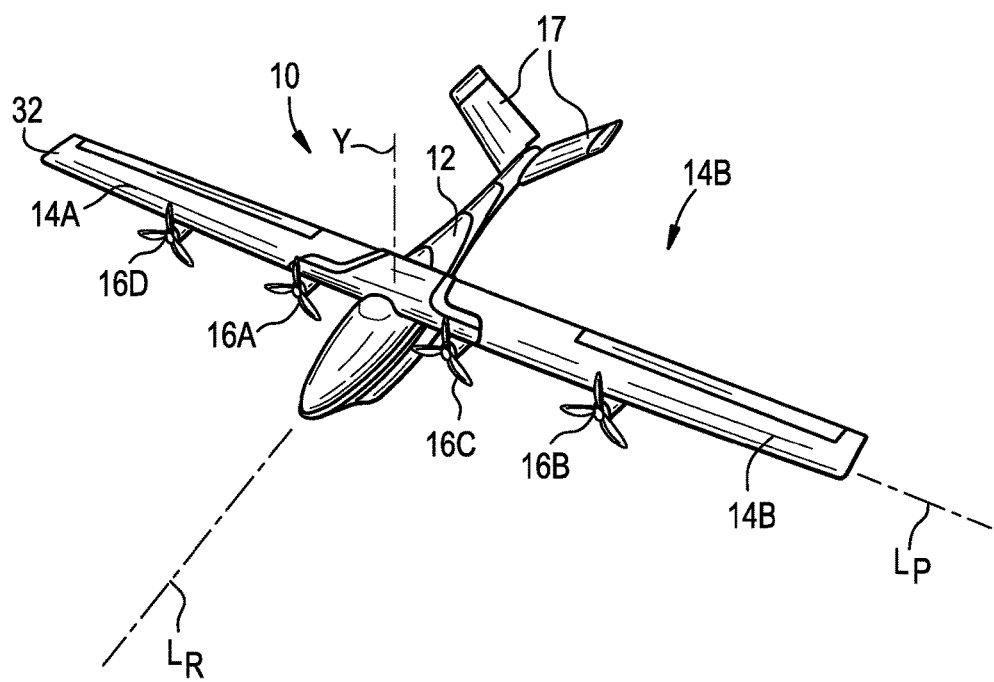
FIG. 2 shows a perspective view of one embodiment of an airframe in a forward flight configuration.

Referring now to FIG. 2, one embodiment of an airframe 10 is provided that allows forward flight and vertical takeoffs and landings. The airframe 10 can include a fuselage 12 and a pair of elongate wings 14A and 14B attached to the fuselage 12, as well as any of a variety of pitch and yaw stabilizers 17 in some embodiments. One or more engines 16A, 16B, 16C, 16D can be mounted on the pair of elongate wings 14A and 14B. As described in greater detail below, the elongate wings 14A and 14B can be rotatable about an axis that is slanted or oblique relative to cardinal axes of the airframe, i.e., a longitudinal axis $L_R$ of the fuselage about which the airframe can roll, a lateral axis $L_P$ about which the airframe can pitch, and a vertical axis Y about which the airframe can yaw. As a result of this wing pivoting configuration, the airframe 10 can be propelled in a forward direction by the engines 16A, 16B, 16C, 16D while the elongate wings 14A and 14B generate lift in a forward flight configuration (FIG. 2), and in a VTOL configuration (FIG. 3) the engines 16A, 16B, 16C, 16D can lift the airframe 10 to allow it to hover, perform vertical takeoffs and landings, or maneuver at slow speeds.

Figure 3:
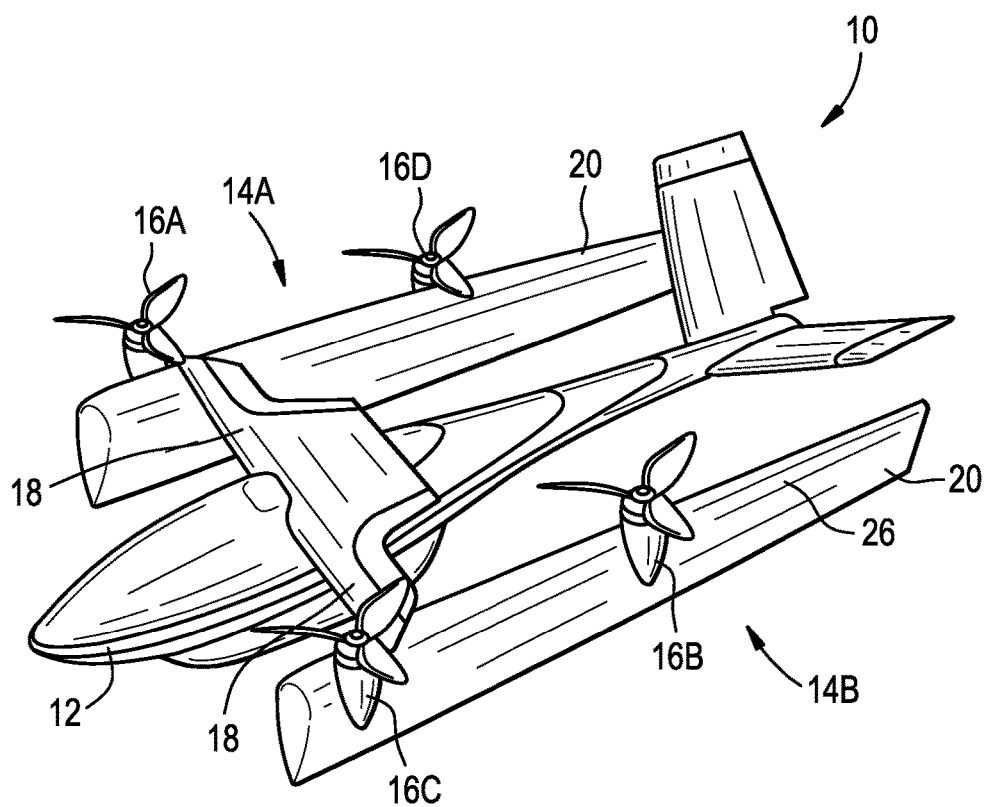
FIG. 3 shows a perspective view of the airframe of FIG. 2 in a vertical takeoff and landing configuration.

FIG. 3 shows the airframe 10 in a vertical takeoff and landing configuration, wherein an outer wing section 20 of each elongate wing 14A, 14B is rotated with respect to an inner wing section 18. In such a vertical takeoff and landing configuration, the engines 16A, 16B, 16C, 16D can be oriented in an upward direction, and the outer wing section 20 can also be oriented vertically such that a vertically-facing surface area of the outer wing section 20 is minimized. Put another way, the intended leading edge 26 of the outer wing section 20 is pointed upward. In such a configuration, the vertically oriented engines 16A, 16B, 16C, 16D can lift the airframe 10 vertically and allow the airframe to hover. Precise control of an aircraft during hover or at slow speed can require sufficient lateral and vertical thrust amplitude and variability to overcome adverse influences from turbulent air currents. Helicopters achieve the required performance envelope by utilizing cyclic and collective control of the rotor disk (i.e., varying pitch and corresponding lift of each rotor blade as the blade completes a revolution to create thrust asymmetry in a desired manner). As another example, quad rotor aircraft (e.g., quadcopters) driven by electric motors can achieve hover controllability by means of electronic throttling of the motor power. In the hovering, VTOL, or low speed flight configuration shown in FIG. 3, either control scheme can be employed. For example, in the illustrated embodiment the four motors 16A, 16B, 16C, 16D can form a quadcopter-like propulsion system. As shown in the figure, the thrusters 16A, 16B, 16C, 16D can be arranged in a square pattern during hover when the wings 14A, 14B are folded. Accordingly, thrust produced by each motor 16A, 16B, 16C, 16D can be modulated to control flight and create any desired thrust asymmetry that results in desired movement through the air. Conversely, in forward flight throttle of the motors 16A, 16B, 16C, 16D can be aligned and generating thrust parallel to the direction of airspeed, as shown in FIG. 2.

Figure 4:
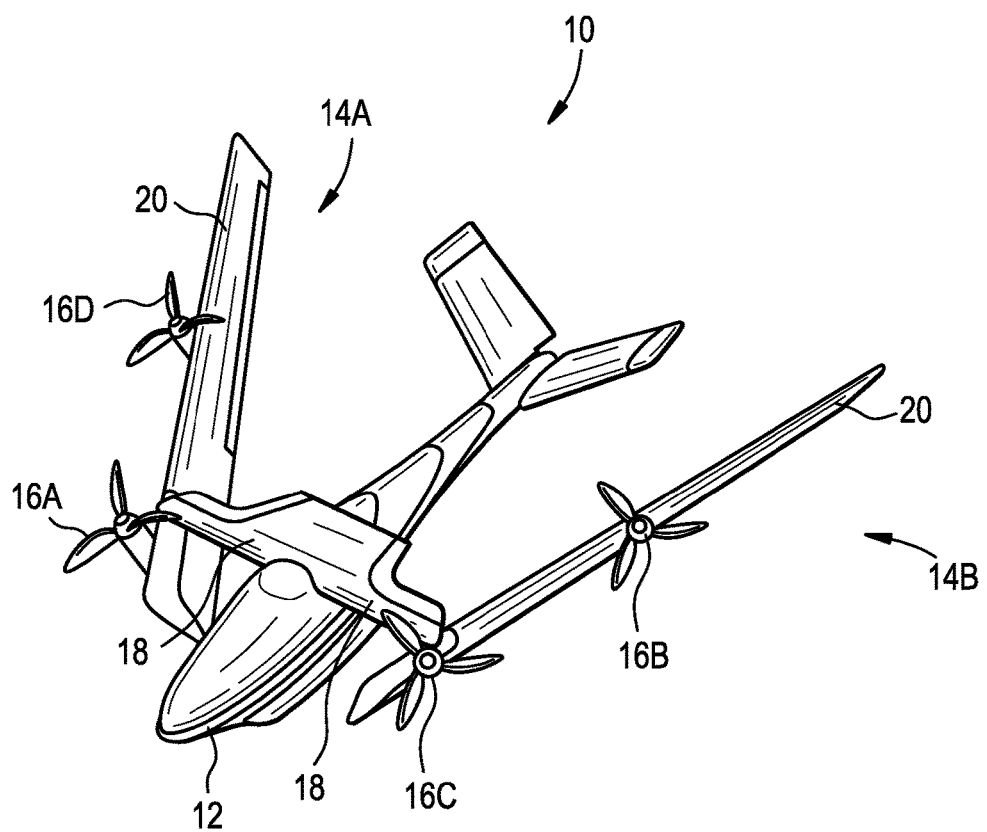
FIG. 4 shows a perspective view of the airframe of FIG. 2 in a first transition configuration.
Figure 5:
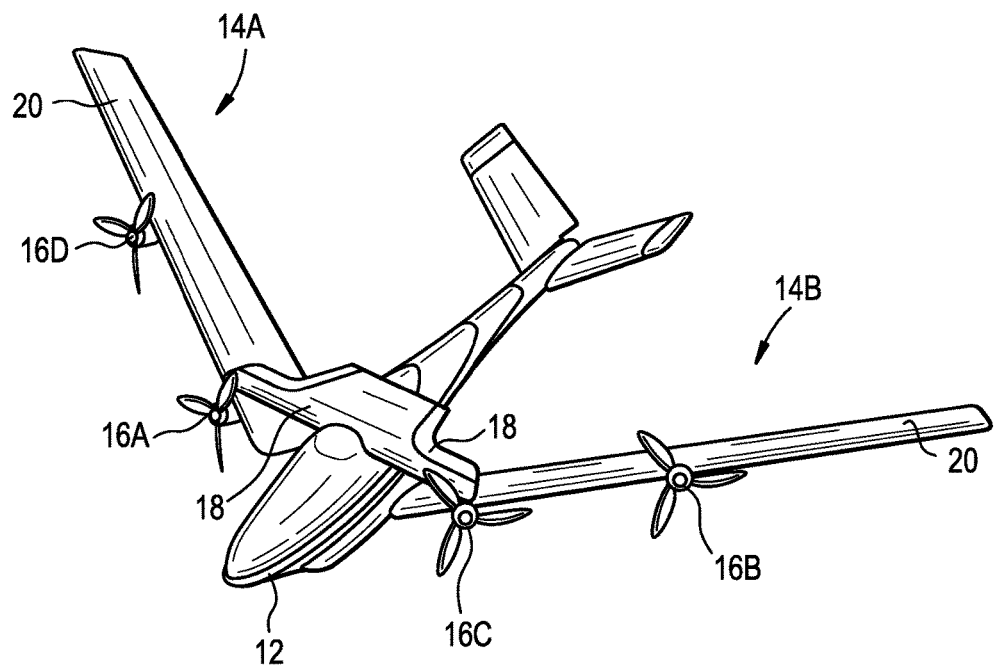
FIG. 5 shows a perspective view of the airframe of FIG. 2 in a second transition configuration.

FIGS. 4 and 5 illustrate various intermediate configurations wherein the second or outer wing section 20 of each wing 14A, 14B can be at least partially rotated, tilted, or folded toward a forward flight configuration to allow the airframe 10 to hover while also moving in a forward direction. In the configuration of FIG. 4, for example, the outer section 20 of each wing 14A, 14B, along with the engines 16A, 16B, 16C, 16D coupled thereto, has begun rotating away from the VTOL configuration of FIG. 3 toward the forward flight configuration of FIG. 2.

To continue a transition to a forward flight configuration, the outer wing section 20 of each elongate wing 14A, 14B can further rotate towards a full forward flight configuration in which the outer and inner wing sections 18, 20 form an uninterrupted wing surface. FIG. 5 illustrates the airframe 10 in a second intermediate wing configuration that can be utilized, for example, to achieve higher speed and/or more efficient forward flight performance than may be possible in the configurations of FIGS. 3 and 4. As noted above, the manner in which the wings and propulsion units pivot relative to the fuselage can enable a stable in-flight transition and allow the airframe 10 to advantageously maintain any intermediate wing configuration indefinitely to achieve desired performance characteristics, such as necessary horizontal speed to avoid wing stall.

Continued advancement of the outer wing section 20 of each wing 14A, 14B can bring the outer wing sections 20 into alignment with the inner wing sections 18 to form an uninterrupted wing surface, as shown in FIG. 2. This can represent a complete transition to a forward flight configuration suited to high speed forward flight wherein the engines 16A, 16B, 16C, 16D produce forward thrust and the wings 14A and 14B create lift on the airframe 10.

Figure 6:
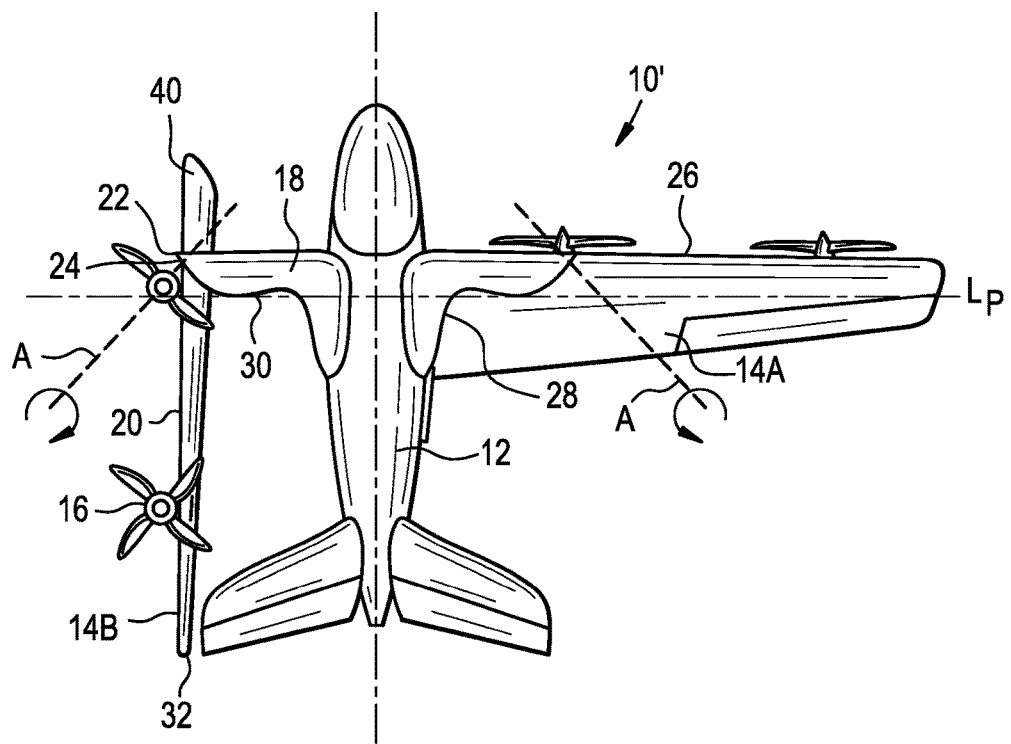
FIG. 6 shows a top view of the airframe of FIG. 1.

FIG. 6 illustrates a top view of the embodiment of FIGS. 2-5 with opposed wings at each extreme of pivoting motion, e.g., the left wing 14B in a hovering or VTOL configuration and the right wing 14A in a forward flight configuration. As noted above, each of the pair of elongate wings 14A, 14B can include a first inner wing section 18 that can be fixed adjacent to the fuselage 12 and a second outer wing section 20 that can be rotatably attached to the first wing section 18. The first wing section 18 can include a pivot 22 located at a distal end 24 of the first wing section 18. The second wing section 20 can be rotatably attached to the pivot 22 adjacent a leading edge 26 of the second wing section 20. The second wing section 20 can include an angled inner or proximal edge 28 that conforms to a shape of an angled outer or distal edge 30 of the first wing section 18. An axis of rotation A of the second wing section 20 relative to the first wing section 18 can be oblique relative to the above-noted cardinal axes of the airframe 10 (e.g., the longitudinal axis $L_R$ about which the airframe rolls and the lateral axis $L_P$ about which the airframe pitches). For example, in some embodiments the axis of rotation A of the second wing section 20 relative to the first wing section 18 can be between about 35° and 55° relative to the lateral axis $L_P$ such that, as the second wing section 20 rotates with respect to the first wing section 18, the second wing section 20 sweeps inward towards the fuselage 12. That is, the wing can move from the position of the wing section 14A in FIG. 6 to the position of the wing section 14B in FIG. 6. The geometry of the wing joint can permit unobstructed airflow to the propellers during a transition between forward flight and hovering configurations. This can also enable indefinite pausing of wing tilting or folding at any intermediate position between the hover and forward flight positions shown in FIGS. 2 and 3 (see, e.g., intermediate positions of FIGS. 4 and 5).

Figure 7:
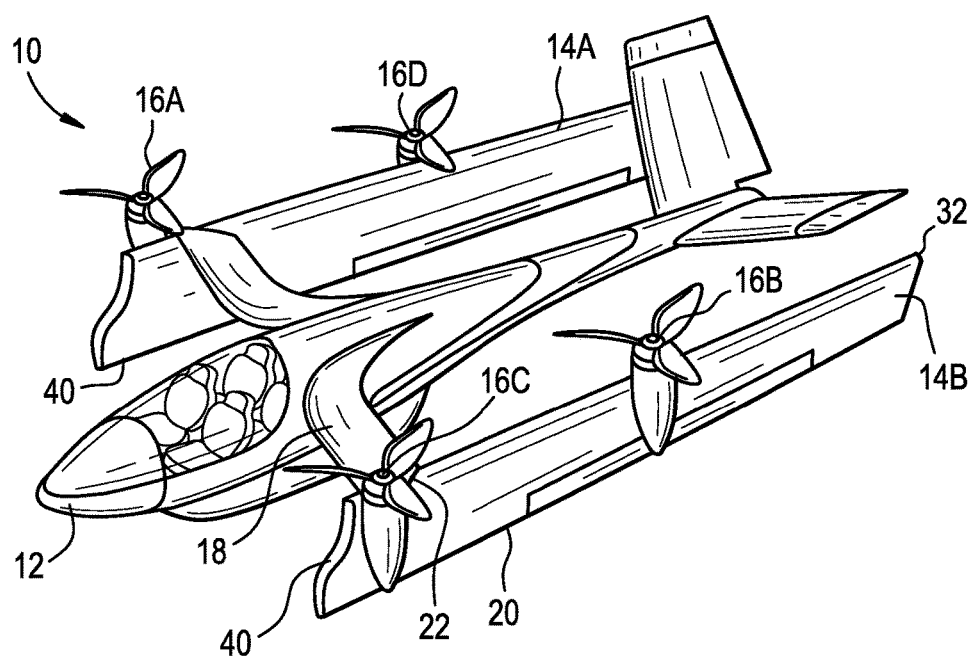
FIG. 7 shows a perspective view of the airframe of FIG. 1 in a vertical takeoff and landing configuration.

The outer wing section 20 of each wing 14A, 14B can carry one or more thrusters or other propulsion units, as well as fuel cells (e.g., batteries, jet fuel, etc.). Referring to FIGS. 6 and 7, the one or more engines 16A, 16B, 16C, 16D can be mounted on each of the pair of elongate wings 14A, 14B. In one embodiment, four engines can be mounted to the pair of elongate wings 14A, 14B. On each of the elongate wings 14A, 14B, one engine (e.g., engines 16A, 16C) can be mounted towards the pivot 22 between the first wing section 18 and second wing section 20, while a second engine (e.g., engines 16B, 16D) can be mounted between the first engine and a wing tip 32 of each of the pair of elongate wings 14A, 14B. In another embodiment, as described below in connection with FIG. 14, each of the pair of elongate wings 14A, 14B can include only one engine mounted thereon (e.g., near a midpoint of each of the pair of elongate wings 14A, 14B). The thrusters, engines, or other propulsion units can be formed of one or more turboprops, turbines, electric motors, or other various suitable engines in use and known for manned aircraft and unmanned aerial vehicles. Further, an output of each of the engines can be independently adjustable, such as by utilizing cyclic or collective controls, or by varying a speed of each of the motors.

Figure 8:
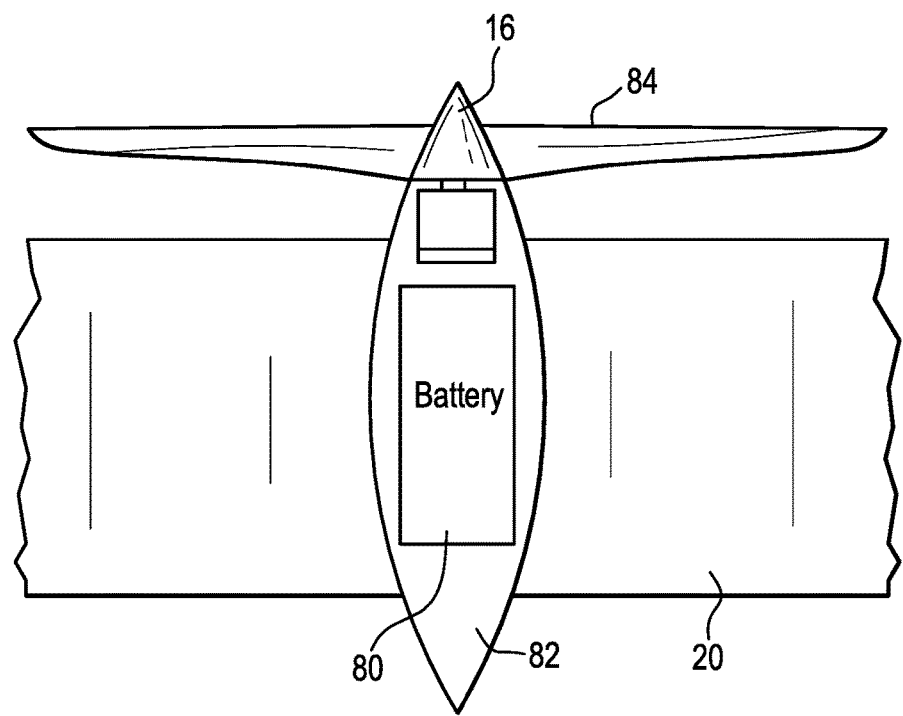
FIG. 8 shows a detail view of one embodiment of a propulsion unit according to the teachings provided herein.
Figure 9:
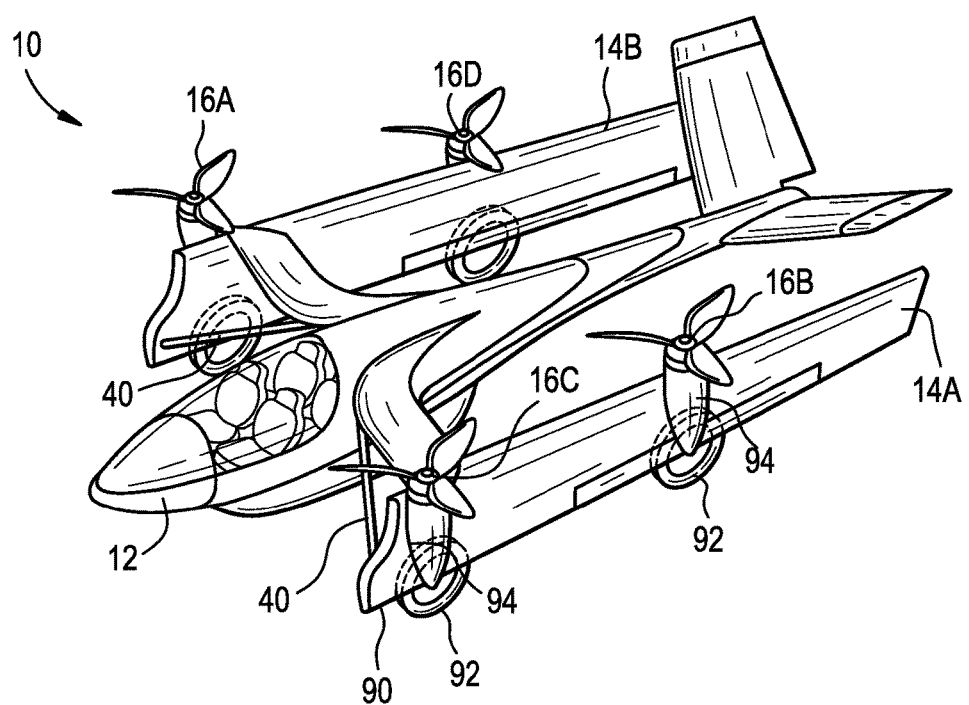
FIG. 9 shows a perspective view of one embodiment of a vertical takeoff and landing airframe equipped with landing wheels.
Figure 10:
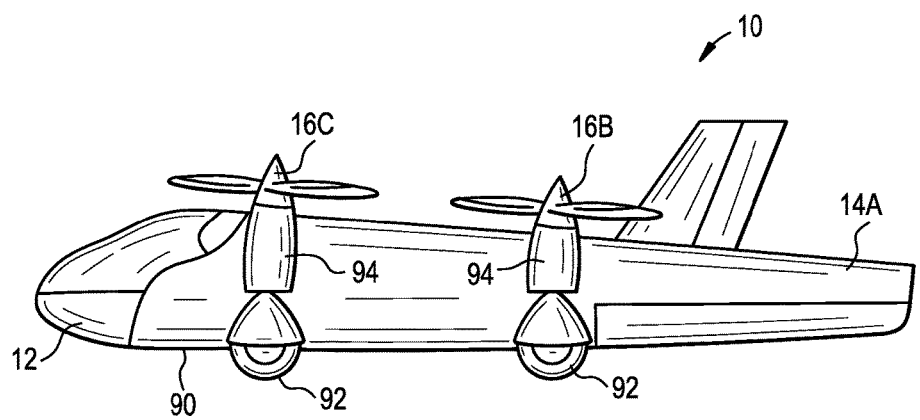
FIG. 10 shows a side view of the airframe of FIG. 9.

In some embodiments, a weight of each outer wing section 20 can be around ⅓ of the total aircraft weight. Such a distribution can allow the center of gravity of the aircraft to be close to the center of wing air pressure during forward flight while also being close to the thrust vector while hovering. In certain embodiments where electric motors are utilized as propulsion units, one or more batteries for powering the motor can be positioned on the wing as well. As shown in FIG. 8, for example, a battery 80 can be housed in a nacelle 82 or other housing that also encloses an electric motor 16 mounted on an wing section 20. Arranging the battery 80 relative to the motor 16 in this manner can have a number of advantages, including, for example, improving weight distribution by moving airframe center of gravity backwards during transition to a hovering configuration, reducing stress on the pivot joint of the wing (e.g., by moving the load away from fuselage toward a center of pressure of each wing), reducing propeller vibrations (e.g., co-locating the battery and propeller can create a stiffer motor support structure with an increased resonance frequency), reducing length and weight of electrical wiring, and increasing ease of access for maintenance and/or replacement. The motor 16 can include a rotor 84 that can produce thrust when rotated through the air by the motor.

As shown in FIGS. 9-12, one or more landing supports can be formed on a trailing edge 90 of each elongate wing 14A, 14B such that, when the airframe 10 is in the vertical takeoff and landing configuration, the landing supports are located towards a surface below the airframe 10 to support the airframe 10 during landing. The landing supports can be formed of one or more of landing wheels, floats, or other various supports. The folded wing configuration of FIGS. 9-12 can allow for road transportation of the aircraft because the width of the aircraft with wings folded can be a small portion of the fully extended wing span. In the embodiment of FIGS. 9-12, one or more wheels 92 can be retractably mounted in a motor cowling 94 of each wing 14A, 14B. In some embodiments, such as the embodiment of FIGS. 9 and 10, a wheel 92 can be mounted in each motor cowling 94 to provide, for example, support at four corners of the aircraft 10. In such embodiments, a subset or all of the wheels can be configured to rotate in a direction perpendicular to the axis of wheel rotation to allow steering, or steering can be achieved by mismatching the speeds of wheels on one side of the aircraft with the speeds of wheels on the other side of the aircraft.

Figure 11:
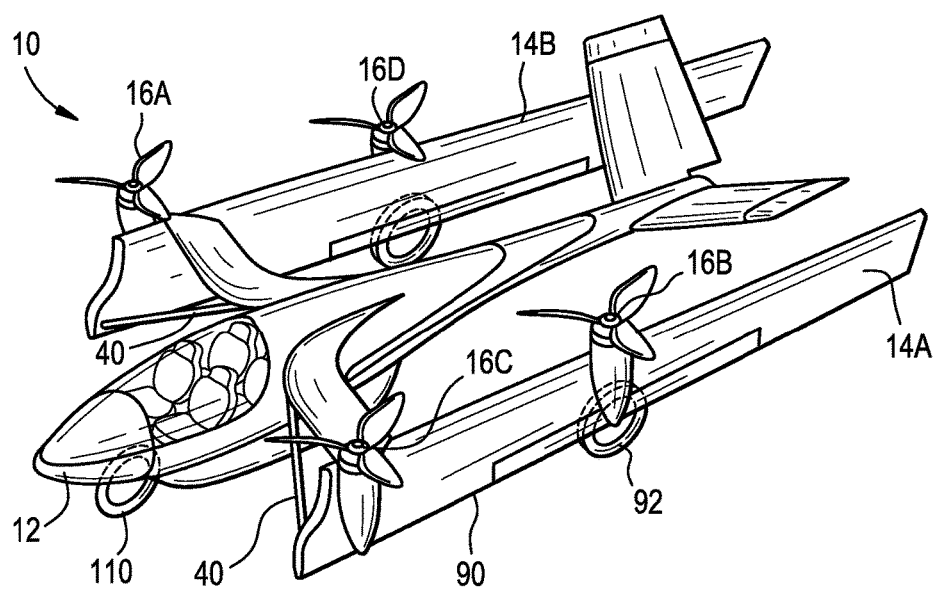
FIG. 11 shows a perspective view of another embodiment of a vertical takeoff and landing airframe equipped with landing wheels.
Figure 12:
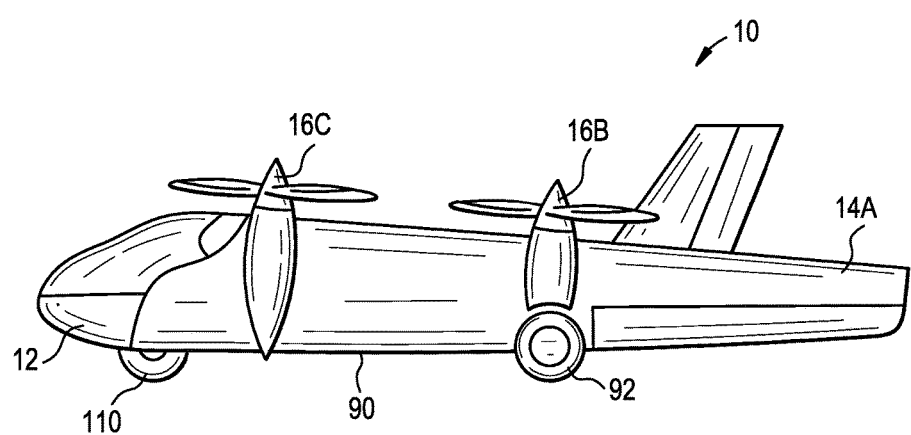
FIG. 12 shows a side view of the airframe of FIG. 11.

In other embodiments, such as the embodiment of FIGS. 11 and 12, at least one wheel 110 can be included in the fuselage 12. Wheels or other landing supports included in the fuselage 12 can be utilized in place of, or in combination with, landing supports on the wings 14A, 14B, depending on the embodiment. In the embodiment of FIGS. 11 and 12, for example, a forward wheel 110 is used in conjunction with wheels 92 mounted in the motor cowlings 94 of the engines 16B, 16D. This can provide effectively support for the aircraft on the ground and, in some embodiments, the forward wheel 110 can be rotatable to permit steering in ground transport. In other embodiments, however, steering can be achieved in other manners, such as asymmetrically controlling speeds of the wheels 92 on each side of the aircraft.

Figure 13:
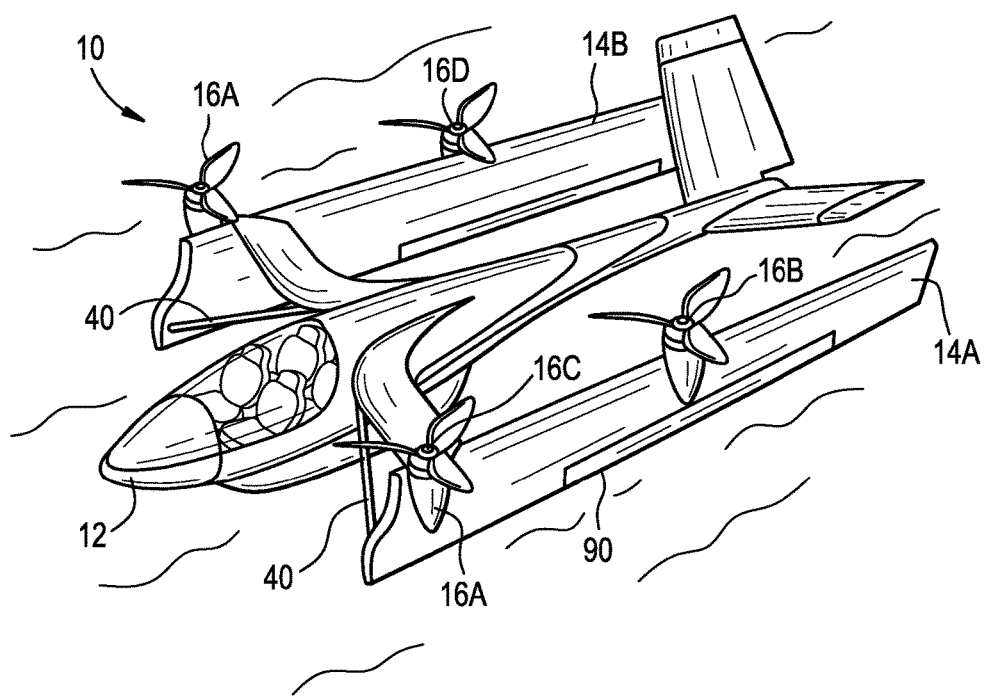
FIG. 13 shows a perspective view of another embodiment of a vertical takeoff and landing airframe equipped for water landings.

The folded wing configuration can also be configured for water landing and transportation. For example, the wings 14A, 14B of the airframe 10 can be buoyant and water-tight to balance the airframe on water, as shown in FIG. 13. Because each motor 16A, 16B, 16C, 16D faces up, only the aileron joints/linkages near the trailing edge 90 of each wing 14A, 14B need to be waterproofed in such an embodiment. Horizontal propulsion in a water-borne embodiment can be created by partially unfolding both wings to create both horizontally and vertically directed thrust. Further, in certain embodiments landing supports, including wheels, floats, pontoons, etc. can be incorporated into the fuselage 12 to replace, or act in conjunction with, structures incorporated into the wings. In some embodiments, various water propulsion mechanisms, such as submerged propellers, etc., can be incorporated into the airframe. Such components can be coupled to any of the fuselage, the wings, or any pontoon, etc. that is coupled to the airframe.

Figure 14:
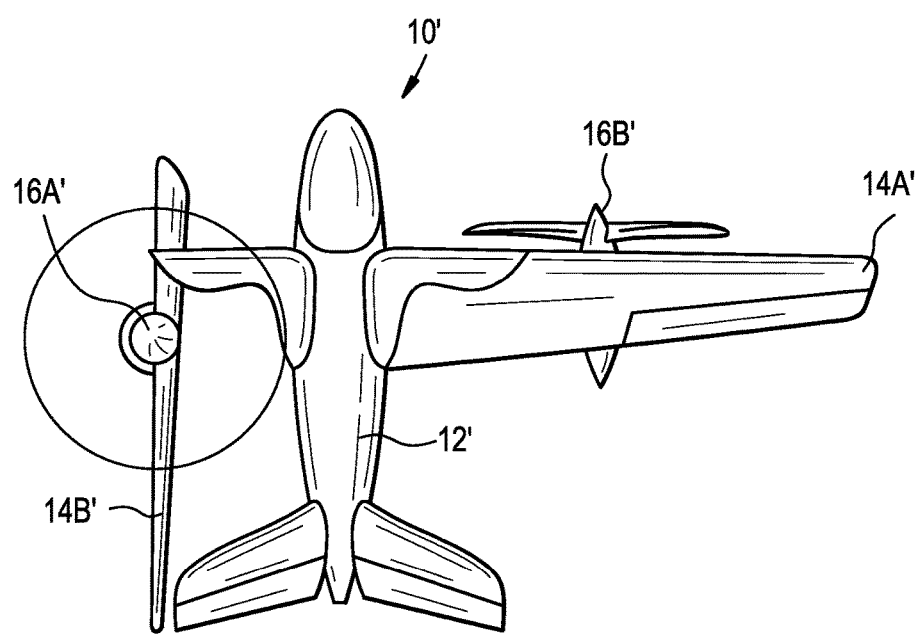
FIG. 14 shows a top view of an alternative embodiment of a vertical takeoff and landing airframe.

The above-described embodiments of an airframe 10 include four propulsion units 16A, 16B, 16C, and 16D, but in other embodiments a different number of propulsion units can be employed. For example, in some embodiments a larger number of propulsion units can be employed, e.g., six, eight, ten, etc. In other embodiments, a smaller number of propulsion units can be employed. For example, and as noted above, in some embodiments propellers associated with one or more of the motors 16A, 16B, 16C, 16D can be configured for cyclic and/or collective rotor control, as in a helicopter. Providing for this type of control can, in some embodiments, allow the number of motors to be reduced. As shown in FIG. 14, for example, an airframe 10' can include two motors 16A' and 16B' mounted to wings 14A' and 14B', respectively, that extend from a fuselage 12'. Each of the motors 16A', 16B' can include a propeller with blades configured for cyclic and collective pitch variation to enable hovering and low speed flight with the wings and rotors tilted as shown by wing 14B'. In a forward flight configuration, as shown by wing 14A' in FIG. 14, the pitch of propeller blades can be left constant (but could also be varied if desirable in other embodiments). Note that in any of the embodiments described herein, a variety of different propulsion technologies can be employed. For example, instead of utilizing electric motors 16 described above, the motors, thrusters, or propulsion units 16' can be any of internal combustion engines, turboprops, turbines, or other various suitable engines in use and known for manned aircraft and unmanned aerial vehicles.

Figure 15:
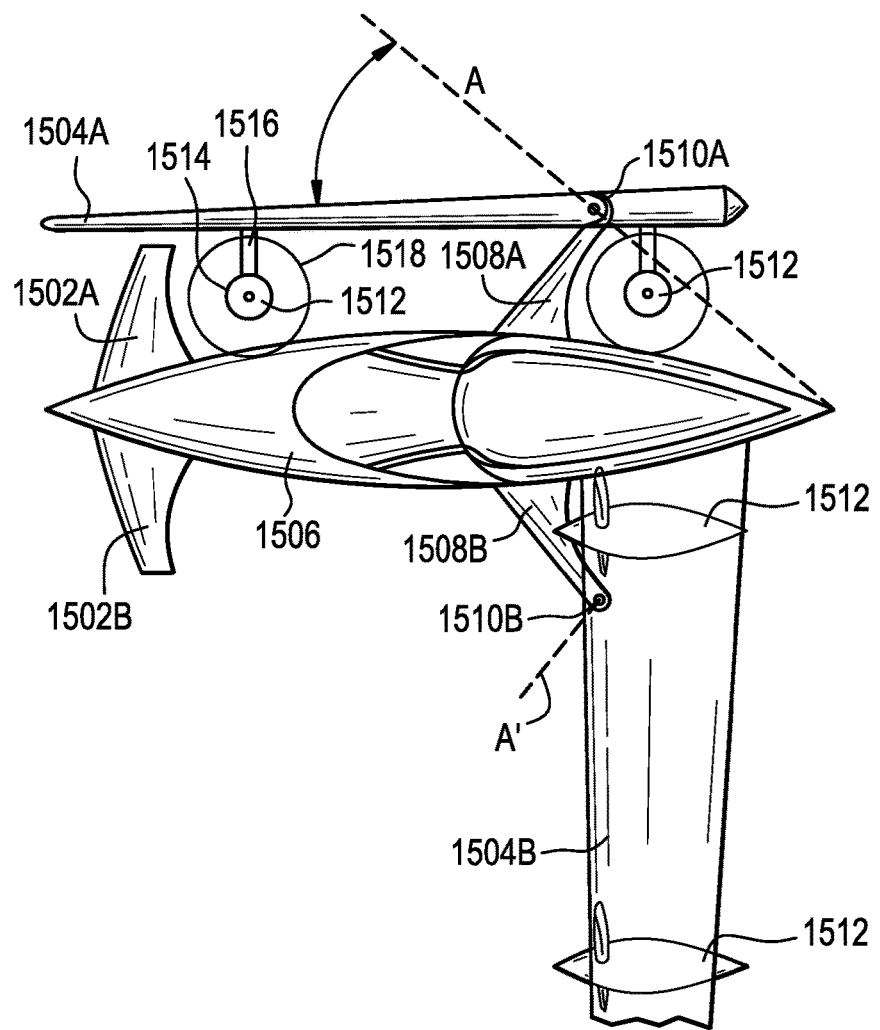
FIG. 15 shows a top view of another embodiment of a vertical takeoff and landing airframe.

Still other embodiments of airframes according to the teachings provided herein can utilize alternative engine and/or wing configurations. FIG. 15, for example, illustrates another embodiment of an airframe 1500 that utilizes a canard wing configuration in which horizontal stabilizers 1502A, 1502B are disposed forward of the main lifting wings 1504A, 1504B. In the illustrated embodiment, the wings 1504A, 1504B can be coupled to a fuselage 1506 by struts 1508A, 1508B that extend from the fuselage. An outer end of each strut 1508A, 1508B can include a pivot joint 1510A, 1510B that couples to the wings 1504A, 1504B and defines pivot axes A, A'. The pivot axes A, A' can be formed at oblique angles to any of a longitudinal or roll axis $L_R$, a lateral or spar or pitch axis $L_P$, and a vertical or yaw axis Y (which extends from the plane of FIG. 15), as described above. Movement of the wings 1504A, 1504B about the pivot axes A, A' relative to the struts 1508A, 1508B and fuselage 1506 can be controlled in any of the manners described herein, e.g., by a wing actuator assembly.

Of note in the airframe 1500 is that the wings 1504A, 1504B are configured to pivot out and down relative to the fuselage 1506 when moving from the VTOL configuration of wing 1504A in FIG. 15 to the forward flight configuration of wing 1504B. This is opposite the wing movement shown in FIGS. 2-5 of the airframe 10 wherein the outer section 20 of each wing 14A, 14B moves outward and upward relative to the fuselage 12 during transition from a VTOL configuration to a forward flight configuration. Also of note is that each engine or propulsion unit 1512 is housed in a nacelle 1514 mounted to one of the wings 1504A, 1504B via a pylon 1516. This offsets the engine from the wing and positions the engine such that, in the VTOL or hover configuration of wing 1504A in FIG. 15, the engine 1512 is disposed between the wing and the fuselage 1506. In some embodiments, this can mean the propeller diameter 1518 is also disposed between the wing and the fuselage, thereby protecting the propeller blades from striking outside objects. It should be appreciated that this configuration of offset engines, wherein the engines are disposed between the wing and the fuselage in the vertical flight configuration, can also be utilized with the other embodiments of airframes described herein.

Figure 16:
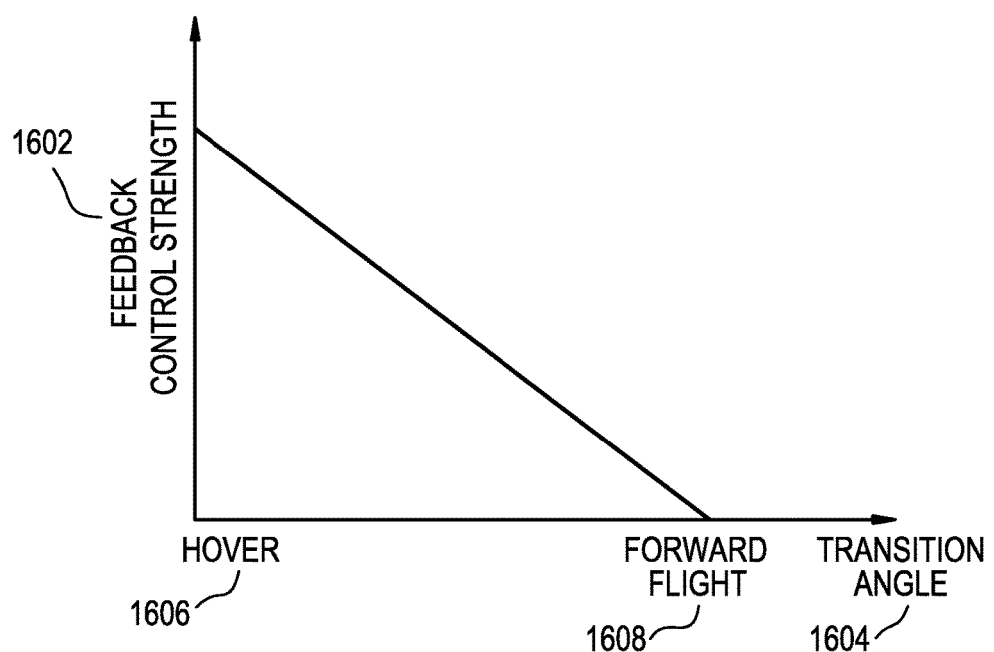
FIG. 16 shows one embodiment of a relationship between flight feedback control strength and wing transition angle.

While the airframes described herein are capable of achieving stable flight throughout the transition between forward flight and hovering configurations, in some embodiments a flight control system can be utilized to achieve stability during hovering and slow speed flight. Exemplary flight control systems are known in the art with regard to quadcopters and other aerial vehicles employing multiple engines and tilting engines. Often these systems employ a proportional-integral-derivative (PID) control feedback loop to modulate throttle of each engine or other propulsion unit in response to aircraft speed, attitude, altitude, and other flight parameters detected using a variety of sensors, such as gyroscopes, altimeters, GPS and other position data, etc. As illustrated in FIG. 16, airframes according to the teachings provided herein can modulate the strength of such flight feedback control 1602 based on the configuration of the airframe, e.g., a transition angle 1604 of the wings relative to the fuselage. For example, a flight control system can impart significant feedback control when the airframe is in a hover configuration 1606 (as shown in FIG. 3) and a strength of such control can be decreased as the wings transition to a forward flight configuration 1608 (as shown in FIG. 2). The change in feedback control strength can be made in a variety of manners. In the illustrated embodiment, for example, feedback control strength is decreased in a linear manner as the wings pivot or tilt between the various configurations.

FIGS. 17-29 illustrate various embodiments of wing pivot joints and actuator assemblies in greater detail. As noted above, the pivot mechanism can allow for transition between hovering and forward flight while an aircraft is in the air. Further, the configuration of the pivot joint along a slanted or oblique axis relative to cardinal axes of the aircraft can provide a smooth and stable transition between flight modes and allow pausing the wings at any of a variety of intermediate positions while maintaining stable flight indefinitely. There are a number of different embodiments for forming the pivot joint and actuating movement of the wing components thereabout, but in general the pivot joint can be positioned on the spar line of the wing at an outer tip of the inner wing portion. The wing spar is a main structural member of the wing that extends laterally or span-wise from the fuselage to the wingtip. By placing the joint on the spar line, it can carry stress and torque between the inner and outer wing sections. The pivoting joint can also utilize a hollow shaft to carry electrical and/or hydraulic lines between the fuselage/inner wing and the outer wing.

Figure 17A:
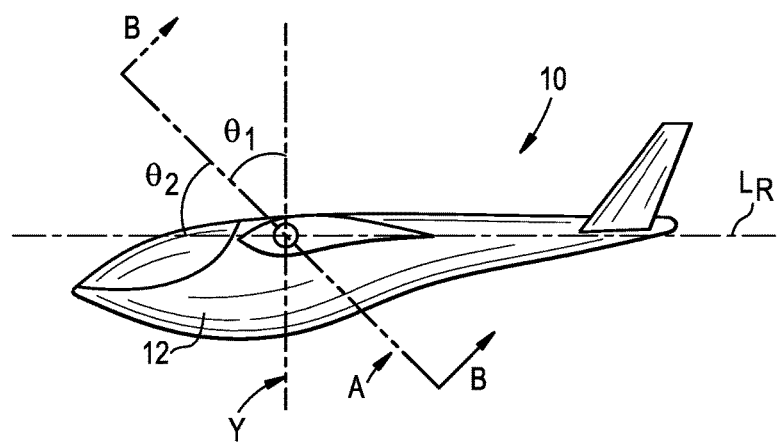
FIG. 17A shows a side view of one embodiment of a vertical takeoff and landing airframe highlighting a pivot axis A projected in a longitudinally-extending vertical plane.
Figure 17B:
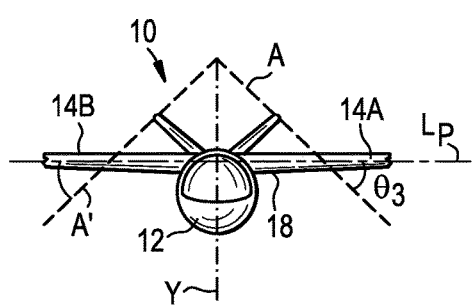
FIG. 17B shows a front view of the airframe of FIG. 17A highlighting the pivot axis A projected in a laterally-extending vertical plane.
Figure 17C:
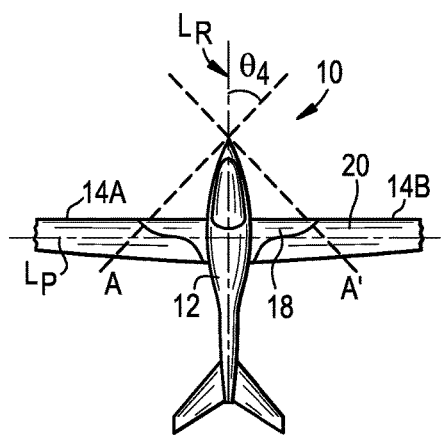
FIG. 17C shows a top view of the airframe of FIG. 17A highlighting the pivot axis A projected in a horizontal plane.

As noted above, the pivot axis can form an oblique angle relative to one or more cardinal axes of the airframe 10. FIGS. 17A-17C illustrate various perspectives of one embodiment of a pivot axis relative to the airframe 10 and its cardinal axes of roll $L_R$, pitch $L_P$, and yaw Y. In the side view of FIG. 17A, it can be seen that the pivot axis A, when projected into the plane of the figure, forms an oblique angle with both the longitudinal or roll axis $L_R$ and the vertical or yaw axis Y. The angle $\theta_1$ between the pivot axis A and the vertical or yaw axis Y can be between about 35 degrees and about 55 degrees in some embodiments. The angle $\theta_2$ between the pivot axis A and the longitudinal or roll axis $L_R$ can similarly be between about 35 degrees and about 55 degrees in certain embodiments. In some embodiments, the angles $\theta_1$, $\theta_2$ can each be about 45 degrees.

FIG. 17B shows a front view of the airframe 10 with projections of these axes. As shown in the figure, the pivot axes A, A' can each form an oblique angle $\theta_3$ with respect to the lateral or pitch axis $L_P$ of the airframe (which can also correspond with a spar axis of the wing). In some embodiments, the angle $\theta_3$ can be between about 35 and about 55 degrees. More particularly, in some embodiments the angle $\theta_3$ can be about 45 degrees.

FIG. 17C shows a top view of the airframe 10 with projections of these axes. As shown in the figure, the pivot axes A, A' can each form an oblique angle $\theta_4$ with respect to the longitudinal or roll axis $L_R$ of the airframe. In some embodiments, the angle $\theta_4$ can be between about 35 and about 55 degrees. More particularly, in some embodiments the angle $\theta_4$ can be about 45 degrees.

Figure 18:
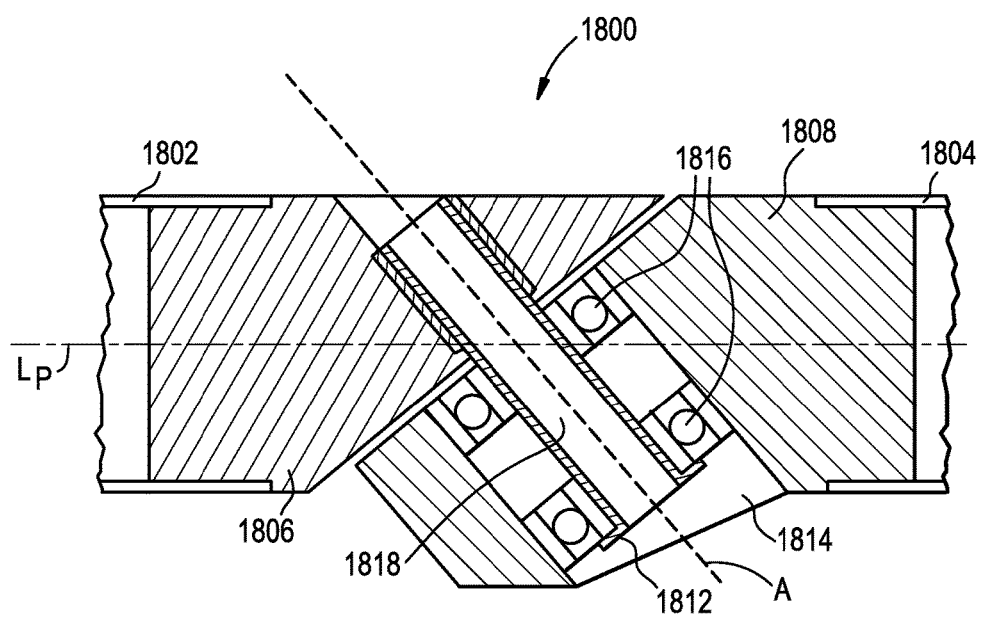
FIG. 18 shows a cross-sectional view in the direction of line B-B of FIG. 17A of one embodiment of a pivot joint.

FIG. 18 illustrates one embodiment of a pivot joint 1800 that can be utilized to permit tilting or folding of an outer wing relative to an inner wing and fuselage of an airframe. The joint defines an interface between the inner wing portion 18 and the outer wing portion 20 and can be positioned along a spar, lateral, or pitch axis $L_P$ that extends along an inner wing spar 1802 and an outer wing spar 1804. A first spar insert 1806 can be coupled to an outer or distal end of the spar 1802 of the inner wing 18 and a second spar insert 1808 can be coupled to an inner or proximal end of the spar 1804 of the outer wing 20. The first spar insert 1806 can include a bore 1810 formed therein that can receive a hollow bolt 1812 that can define the pivot axis A about which the outer wing 20 can move relative to the inner wing 18 and fuselage 12. The second spar insert 1808 can include a bore 1814 formed therein that can receive one or more bearing assemblies 1816 that can ensure alignment and reduced friction movement of the inner and outer wing portions 18, 20 relative to one another. As noted above, the hollow bore 1818 of the bolt 1812 can be utilized to pass components through the rotating joint, such as electrical wiring, fuel hoses, hydraulic hoses, etc. The various components can be formed from a variety of materials. For example, the hollow bolt can be formed from steel, titanium, or other material of sufficient strength. Other components, such as the spars, spar inserts, etc. can be formed from any of a variety of materials, including steel, titanium, carbon fiber, or other known materials.

Figure 19:
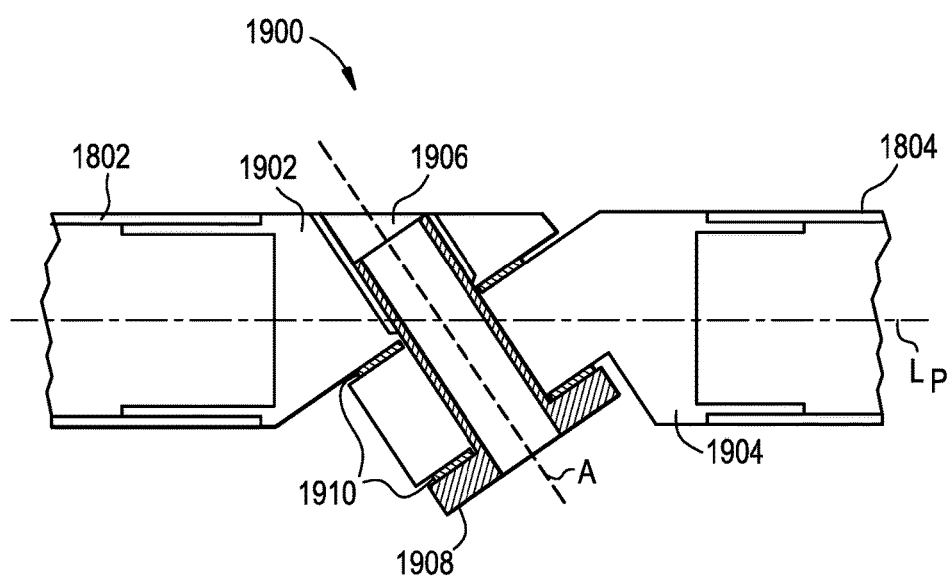
FIG. 19 shows a cross-sectional view in the direction of line B-B of FIG. 17A of another embodiment of a pivot joint.

FIG. 19 illustrates an alternative embodiment of a pivot joint 1900 that is similar to joint 1800 shown in FIG. 18 but utilizes low friction washers in place of bearing assemblies. For example, a similar first spar insert 1902 can be coupled to the inner wing spar 1802 and a second spar insert 1904 can be coupled to the outer wing spar 1804. A bore 1906 formed in the first spar insert 1902 can receive a hollow bolt 1908 formed of steel, titanium, etc. around which the second spar insert 1904 can be disposed. Low friction washers 1910 can be disposed around the bolt 1908 on either side of the second spar insert 1904 to aid in reducing friction as the outer wing 20 pivots relative to the inner wing 18 about the pivot axis A. The low friction washers can be formed from any of a variety of known materials, including, for example, sintered bronze impregnated with oil.

Figure 20:
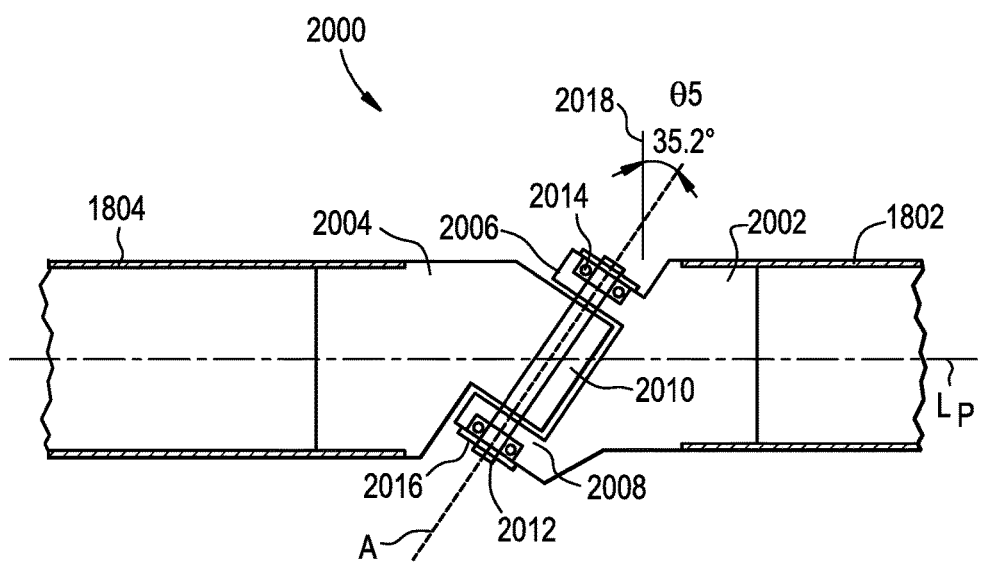
FIG. 20 shows a cross-sectional view in the direction of line B-B of FIG. 17A of another embodiment of a pivot joint.

FIG. 20 illustrates still another embodiment of a pivot joint 2000 that employs a clevis pin and ball bearings to facilitate low friction movement with an ability to absorb high stresses along the wing spar. Note that the joint 2000 of FIG. 20 is reversed from the joints shown in FIGS. 18 and 19. Such an inversion can illustrate, for example, a difference between a joint used in an aircraft's left wing in comparison to its right wing. The joint 2000 can also be drawn in the manner of FIGS. 18 and 19, and both such configurations are within the scope of the invention. Returning to FIG. 20, a first spar insert 2002 is coupled to an inner wing spar 1802 and a second spar insert 2004 is coupled to an outer wing spar 1804, similarly to the pivot joints described above. Protruding arms 2006, 2008 of the first spar insert 2002 receive an inner or proximal end 2010 of the second spar insert 2004 and a clevis pin 2012 can be inserted through aligned bores formed in each of the arms 2006, 2008 and end 2010 along the pivot axis A. Bearings 2014, 2016 can be disposed about the pin 2012 and anchored relative to the arms 2006, 2008 of the first spar insert 2002 to ensure alignment of the pin and reduce friction during relative movement of the inner and outer wing portions.

As shown in the figure, the pivot axis A can form an angle $\theta_5$ with a vertical axis 2018 that can be parallel to the yaw axis Y. In some embodiments, the angle $\theta_5$ can be between about 25° and about 45°. In the illustrated embodiment, for example, the angle can be about 35 degrees. Recall that FIG. 20 is illustrated in a plane normal to the pivot axis A, as shown in FIG. 17A. Accordingly, the angles shown in FIG. 20 can produce the above-described angles of FIGS. 17A-17C when projected into the various planes of those figures.

Figure 21:
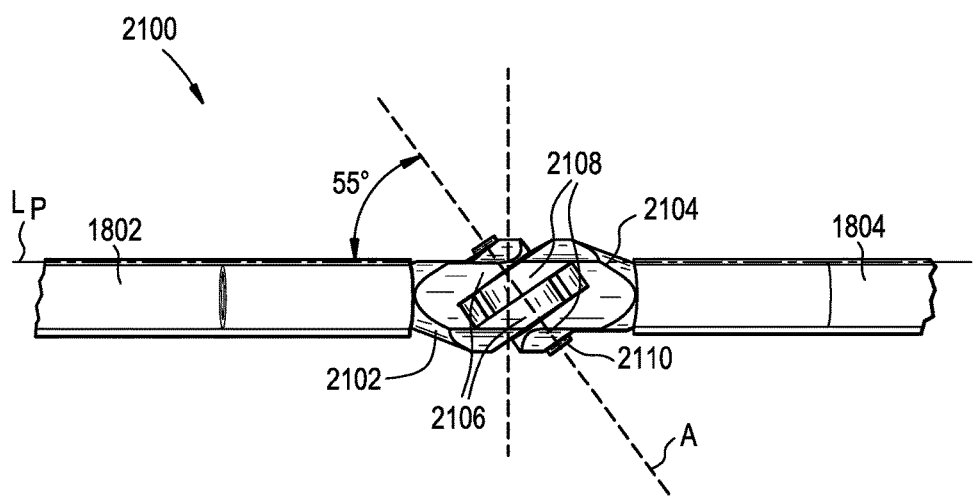
FIG. 21 shows a cross-sectional view in the direction of line B-B of FIG. 17A of still another embodiment of a pivot joint.

FIG. 21 illustrates another embodiment of a pivot joint 2100 similar to the clevis joint 2000. The joint 2100 can include a first spar insert 2102 coupled to a first spar 1802 and a second spar insert 2104 coupled to a second spar 1804. The first and second spar inserts 2102, 2104, can have arms 2106, 2108, respectively, configured to interface with one another such that a clevis pin, bolt, or other securing member 2110 can be disposed through aligned bored formed in the arms 2106, 2108. The aligned bores and clevis pin 2110 can define a pivot axis A that can be offset from a lateral or pitch axis $L_P$ by about 55° in some embodiments.

Figure 22A:
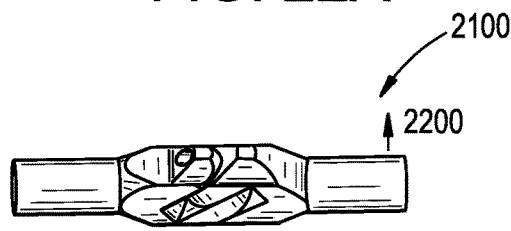
FIG. 22A shows a top perspective view of the pivot joint of FIG. 21 in a straight configuration.
Figure 22B:
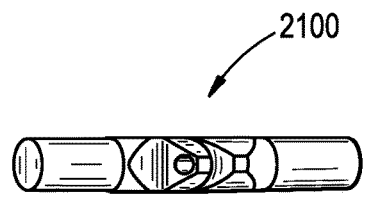
FIG. 22B shows the pivot joint of FIG. 21 in a straight configuration along the pivot axis A of FIG. 21.
Figure 23A:
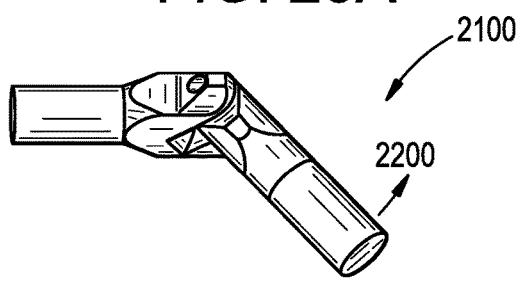
FIG. 23A shows a top perspective view of the pivot joint of FIG. 21 in an intermediate configuration.
Figure 23B:
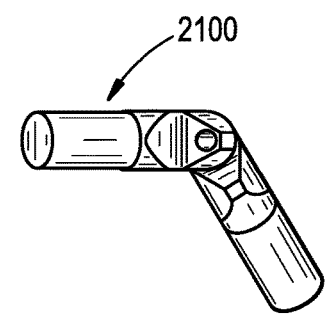
FIG. 23B shows the pivot joint of FIG. 21 in an intermediate configuration along the pivot axis A of FIG. 21.
Figure 24A:
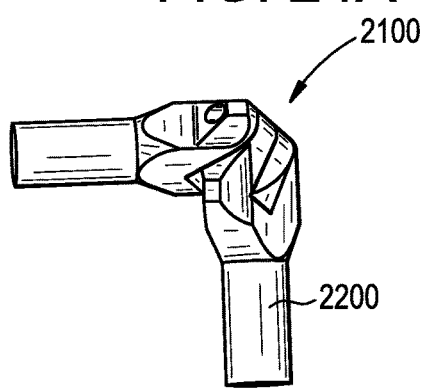
FIG. 24A shows a top perspective view of the pivot joint of FIG. 21 in a fully articulated configuration.
Figure 24B:
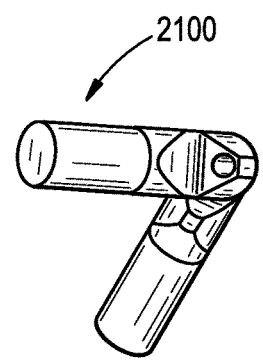
FIG. 24B shows the pivot joint of FIG. 21 in a fully articulated configuration along the pivot axis A of FIG. 21.

FIGS. 22A-24B illustrate exemplary motion of the pivot joint 2100 in straight (e.g., FIGS. 22A and 22B), intermediate (FIGS. 23A and 23B), and fully articulated (FIGS. 24A, 24B) configurations. The views of FIGS. 22A, 23A, and 24A are top views looking down along a yaw axis Y. The views of FIGS. 22B, 23B, and 24B are taken along the pivot axis A of FIG. 21. In one embodiment, motion of a wing about the pivot joint 2100 can be visualized by taking the arrow 2200 as a leading edge indicator. In FIG. 22A, the leading edge points upward in the plane of the page, as in a top view of an airframe in a forward flight configuration (e.g., FIG. 2). As the wing is tilted in a transition to a VTOL configuration e.g., FIG. 4), the leading edge indicator 2200 moves up out of the plan of the page and pivots outward/backward, as in FIG. 23A. Finally, when the wing is fully pivoted to a hovering configuration (e.g., FIG. 3), the leading edge indicator 2200 points directly out of the page in a top view, as in FIG. 24A.

Figure 25:
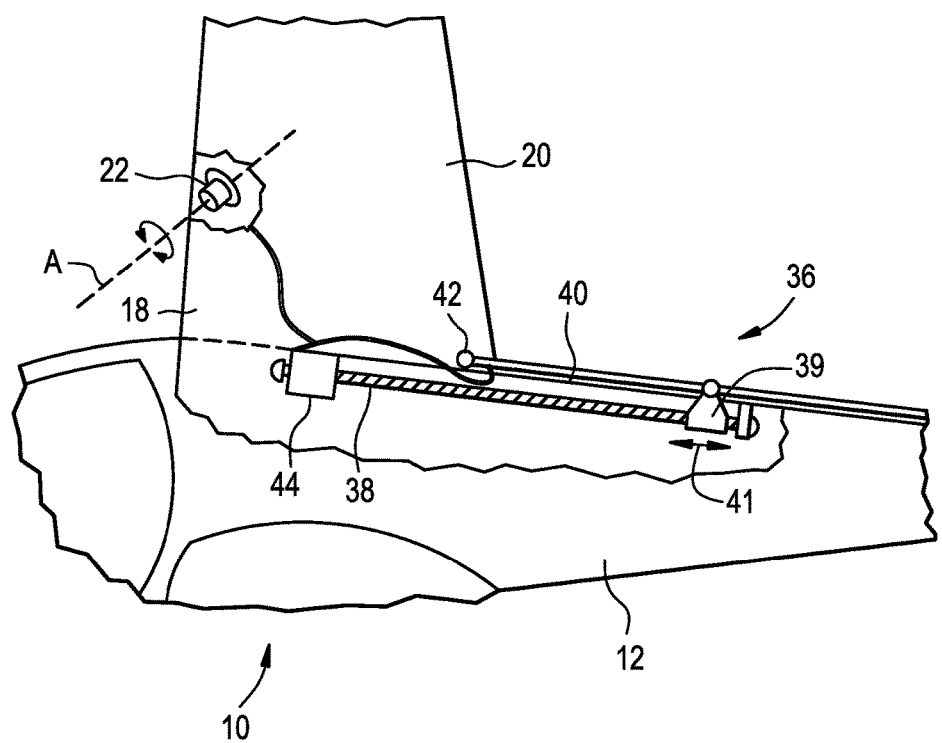
FIG. 25 shows a partially-transparent top view of one embodiment of a wing actuator assembly of an airframe.

FIGS. 25-28 illustrate various mechanisms for actuating the motion of an outer wing portion 20 relative to an inner wing portion 18 and fuselage 12. Turning to FIG. 25, one embodiment of a wing actuator assembly 36 for rotating the second or outer wing section 20 relative to the first or inner wing section 18 is shown from above an airframe 10. In the illustrated embodiment, the actuator assembly 36 includes a lead screw 38 and a linkage 40 mounted between a lead screw traveler 39 and a linkage mount 42 on the outer wing portion 20. A motor 44 or other actuator can rotate the lead screw 38, thereby causing the traveler 39 to move along a length of the lead screw 38, as indicated by arrows 41. As the traveler 39 moves along the length of the lead screw 38, the linkage 40 coupled thereto can cause the second outer wing section 20 to rotate between a forward flight configuration (e.g., FIG. 2) and a vertical takeoff and landing configuration (e.g., FIG. 3).

Figure 26A:
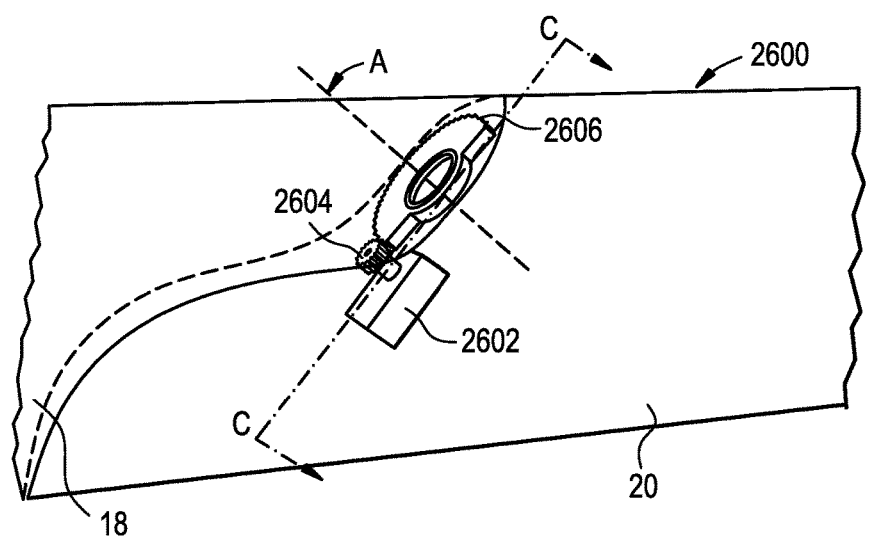
FIG. 26A shows a partially-transparent top view of another embodiment of a wing actuator assembly of an airframe.
Figure 26B:
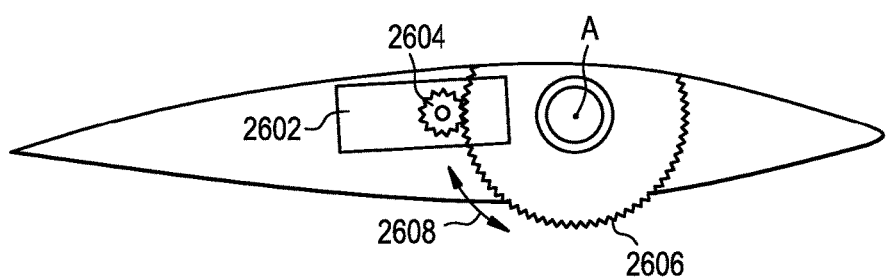
FIG. 26B shows a partially-transparent view of the wing actuator assembly of FIG. 26A taken along the line C-C of FIG. 26A.

The mechanical linkage and lead screw drive of FIG. 25 is just one example of a wing actuator assembly according to the teachings provided herein. In another embodiment of a wing actuator assembly 2600 illustrated in FIGS. 26A and 26B, rotary gears are utilized to control movement of an outer wing portion 20 relative to an inner wing portion 18. As shown in the figures, a motor 2602 can be disposed within the outer wing portion 20 can rotate a drive gear 2604 that can be meshed with a stationary gear rack 2606 formed on the inner wing portion 18. This can result in the drive gear 2604 traveling around a circumference of the rack 2606 in the direction of arrows 2608, as shown in the view of FIG. 26 taken along the line C-C in FIG. 26A. Because the motor 2602 and drive gear 2604 can be coupled to the outer wing portion 20, movement of the drive gear 2604 around the rack 2606 can cause the outer wing portion 20 to rotate relative to the inner wing portion 18 about the pivot axis A. While the illustrated embodiment shows the motor 2602 and drive gear 2604 coupled to the outer wing portion 20, in other embodiments the arrangement can be reversed such that these components are coupled to the inner wing portion 18 and the gear rack 2606 is formed on or coupled to the outer wing portion 20. Further, any of a variety of different gear trains including gears of various sizes can be employed to achieve the wing movement described herein.

FIGS. 27A-28B illustrate another embodiment of a wing actuator assembly 2700 that utilizes opposed hydraulic, pneumatic, electric, or other linear actuators to effect pivoting or folding movement of an outer wing portion 20 relative to an inner wing portion 18 about a pivot axis A. As shown in the figures, a pivot joint between the inner wing 18 and the outer wing 20 can be formed on a spar or lateral axis $L_P$ and the joint can be configured such that it is at an oblique angle $\theta_6$ thereto when projected into the plane of the figure. In the illustrated embodiment, the angle $\theta_6$ can be about 45 degrees, but other angles are also possible, as noted above. The pivot joint can also be formed at oblique angles to the axis $L_P$, as well as other axes, such as a vertical or yaw axis Y and a longitudinal or roll axis $L_R$. As shown in the front view of FIG. 27B, for example, the pivot axis A can be disposed at an angle $\theta_7$ relative to the spar, lateral, or pitch axis $L_P$, and in some embodiments this angle can be about 45 degrees when projected into the plane of the figure as well. FIG. 27C further shows the pivot axis A formed at an angle $\theta_8$ relative to the yaw or vertical axis Y when projected into the side view vertical plane. In such a view, the angle $\theta_8$ can also be about 45 degrees in some embodiments.

Referring to FIGS. 27A-28A, the wing actuator assembly 2700 can include a first linear actuator 2702 coupled at a first end 2802 thereof to the inner wing 18 and a second linear actuator 2704 coupled at a first end 2804 thereof to the outer wing 20. A second end 2806 of the first linear actuator 2702 and a second end 2808 of the second linear actuator 2704 can be coupled to a ring 2810 disposed between the inner and outer wings 18, 20 and configured to rotate about the pivot axis A. The couplings 2806, 2808 to the first and second linear actuators 2702, 2704 can be disposed on opposing sides of the ring 2810. In some embodiments, the couplings can be disposed on opposing sides in both a radial direction (e.g., the plane of FIG. 28A) and an axial direction (e.g., along the pivot axis A).

Figure 27A:
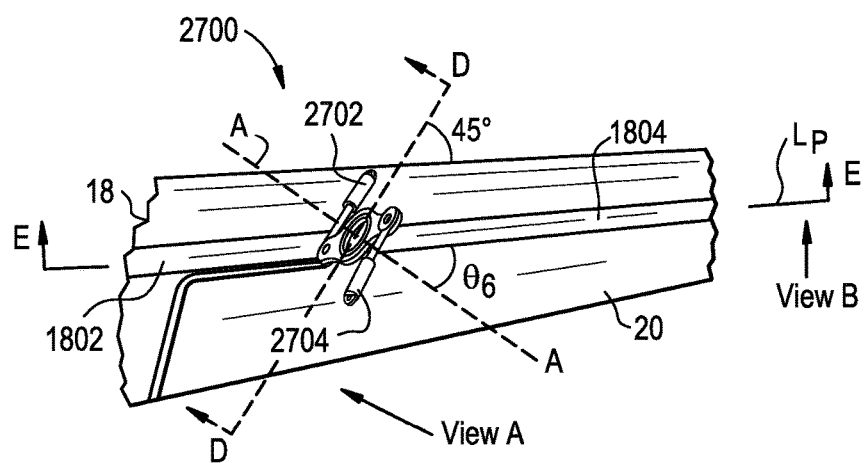
FIG. 27A shows a partially-transparent top view of another embodiment of a wing and actuator assembly of an airframe.
Figure 27B:
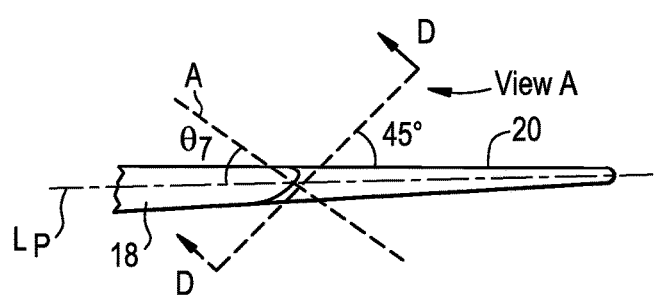
FIG. 27B shows a front view of the wing of FIG. 27A.
Figure 27C:
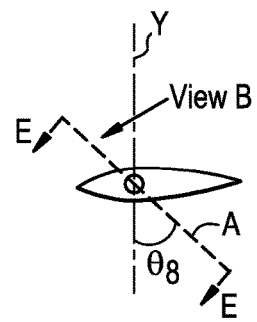
FIG. 27C shows a side view of the wing of FIG. 27A.
Figure 28A:
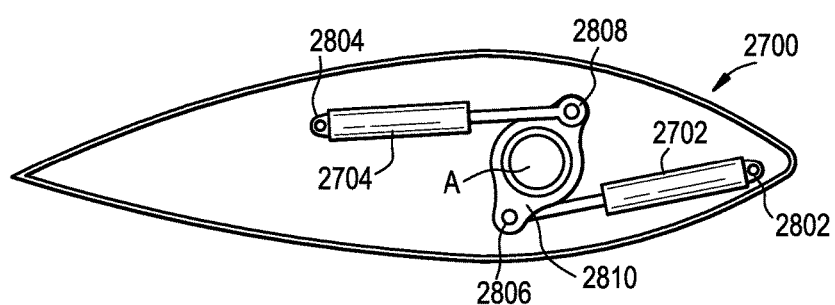
FIG. 28A shows a partially-transparent view of the wing of FIG. 27A taken along the line D-D of FIGS. 27A and 27B.
Figure 28B:
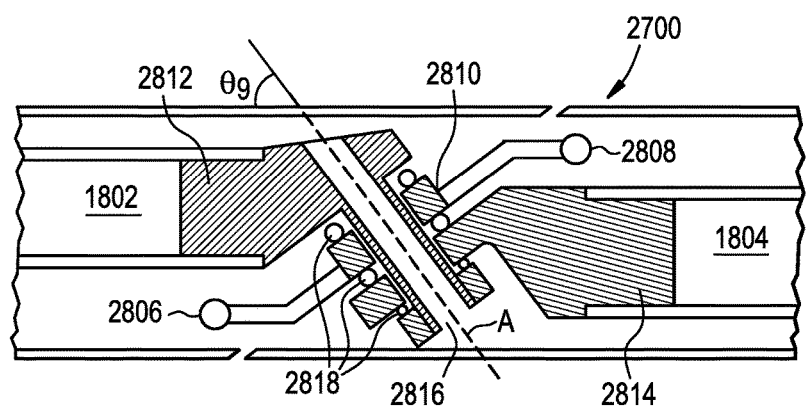
FIG. 28B shows a cross-sectional view of the wing of FIG. 27A taken along the line E-E of FIGS. 27A and 27C.

FIG. 28B, which shows a cross-sectional view along the line E-E shown in FIGS. 27A and 27C, illustrates the wing actuator assembly 2700 and pivot joint in more detail. As shown in the figure, the pivot joint disposed between the inner wing spar 1802 and outer wing spar 1804 can include an inner spar insert 2812 and an outer spar insert 2814 that are coupled to the inner and outer spars 1802, 1804, respectively, and include bores formed therein that can receive a bolt, pin, or other connecting member 2816 that extends along the pivot axis A. The ring 2810 can be disposed between the inner spar insert 2812 and outer spar insert 2814 around the connecting pin or member 2816. Also visible in the figure are the couplings 2806, 2808 to the first and second linear actuators 2702, 2704 (not visible in FIG. 28B). Further, thrust bearings 2818 can be disposed between the various components to permit reduced friction movement of the components relative to one another about the pivot axis A. In operation, actuation of both the first and second linear actuators 2702, 2704 can exert forces on the inner and outer wings 18, 20 through the couplings 2802, 2804 and cause the outer wing 20 to move about the pivot axis A relative to the inner wing 18. Also shown in FIG. 28B is the angle $\theta_5$ formed between the pivot axis A and a lateral axis $L_P$ in the plane of the figure. This angle can be between about 25° and about 45° in some embodiments to create the above-described angles in FIGS. 17A-17C. For example, in some embodiments the angle $\theta_5$ can be about 35° (e.g., 35.2°) to result in the angles $\theta_1$-$\theta_4$ of FIGS. 17A-17C being about 45° each.

Figure 29:
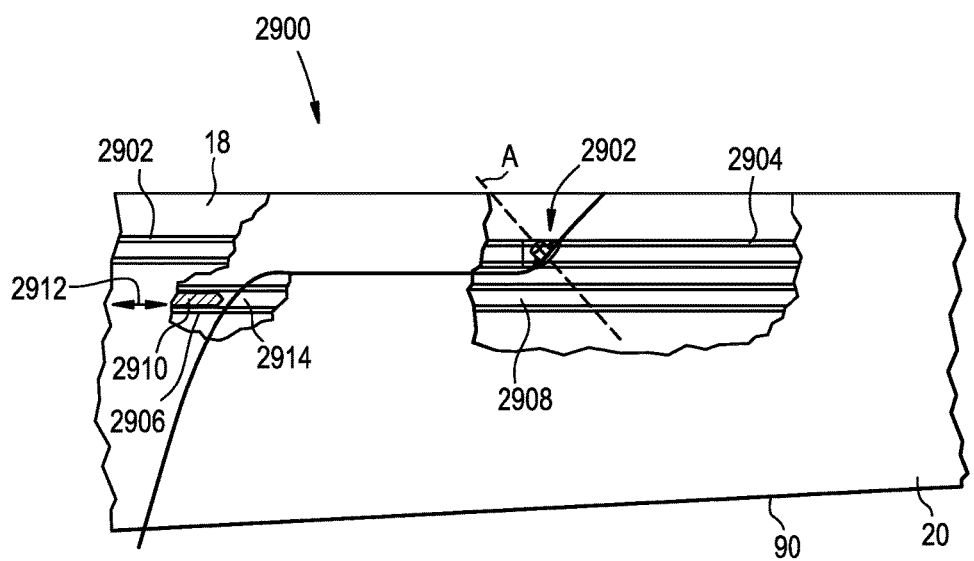
FIG. 29 shows a partially-transparent top view of one embodiment of a dual-spar airframe wing.

FIG. 29 illustrates one embodiment of a wing 2900 that includes two spars that can be employed, for example, for high stress applications. Examples of high stress applications can include those where a low profile airfoil wing design is employed (e.g., a small wing thickness or dimension in a direction perpendicular to the wing chord line), as the reduced thickness of the wing can make it more susceptible to stress. Another example of a high stress application can be an airframe configured to experience high G forces (e.g., up to 5 Gs and beyond). The wing 2900 can be divided into an inner wing 18 fixed to a fuselage and an outer wing 20 pivotally coupled thereto, as described above. For example, a pivot joint 2902 can be disposed between a first inner spar 2904 and a first outer spar 2906. The pivot joint 2902 can provide for movement of the outer wing 20 relative to the inner wing 18 about a pivot axis A and can utilize any of the embodiments described herein and illustrated, for example, in FIGS. 18-24B.

The wing 2900 can also include a second spar offset from the first spar, e.g., disposed between the first spar and a trailing edge 90 of the wing. The second spar can be divided into second inner spar 2906 and a second outer spar 2908. The second inner and outer spars 2906, 2908 can be configured to rigidly couple to one another such that stresses can be carried without interruption. In the illustrated embodiment, for example, a translating locking pin 2910 can be disposed in a recess formed in the spars 2906, 2908. When in a forward flight configuration, the recesses formed in the spars 2906, 2908 can be aligned and the locking pin translated along arrows 2912 in FIG. 29 to be disposed across an interface 2914 between the inner wing 18 and the outer wing 20. As a result, the second inner and outer spars 2906, 2908 can be effectively joined as a single spar spanning an entire length of the inner and outer wings 18, 20. To pivot the wings into a VTOL or other intermediate configuration, the locking pin 2910 can be translated to one side of the interface 2914, thereby separating the second inner and outer spars 2906, 2908 to allow the components to separate as the outer wing 20 pivots about the joint 2902 and pivot axis A relative to the inner wing 18.

The various airframes of the present disclosure advantageously allow for transition from a vertical takeoff and landing configuration to a forward flight configuration. In the vertical takeoff and landing configuration, weight of the various components mounted to the wings pivoting wing portions can be located close to the fuselage, thereby reducing any moment of inertia created by mass disposed remote from a center of gravity of the airframe. Further, the pivoting wing portions can be oriented in a substantially vertical direction with a leading edge thereof facing upward, thereby allowing unobstructed and maximally-efficient airflow over the wings during vertical flight. In addition, propulsion units coupled to the wings can be oriented in a vertical direction so as to support a weight of the craft with their thrust force. Conversely, in a forward flight configuration, the engines coupled to the wings can be rotated and moved further away from a center of gravity of the airframe, thereby creating greater stability during forward flight and vectoring propulsion unit thrust in a horizontal direction to maximize efficiency while the wings create aerodynamic lift force to support the weight of the craft.

The foregoing description of preferred embodiments of the present disclosure has been presented for purposes of illustration and description. The described preferred embodiments are not intended to be exhaustive or to limit the scope of the disclosure to the precise forms disclosed. Additional modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. An aircraft, comprising:
a fuselage;
opposed wings extending from opposed sides of the fuselage;
a plurality of engines, wherein at least one engine is mounted to each of the opposed wings;
wherein at least a portion of each opposed wing including at least one of the plurality of engines rotates relative to the fuselage around a rotation axis that is non-perpendicular and transverse to a longitudinal axis of the fuselage between a first configuration adapted for vertical take-off and landing, and a second configuration adapted for horizontal flight,
wherein the plurality of engines provide lift to the aircraft in the first configuration.

2. The aircraft of claim 1, wherein a first angle between the rotation axis and the longitudinal axis of the fuselage projected in a plane containing the longitudinal axis of the fuselage and an axis extending between ends of the opposed wings is between about 35° and about 55°.

3. The aircraft of claim 2, wherein the first angle is about 45°.

4. The aircraft of claim 2, wherein a second angle between the rotation axis and the axis extending between ends of the opposed wings projected in a plane containing the axis extending between ends of the opposed wings and perpendicular to the longitudinal axis of the fuselage is between about 35° and about 55°.

5. The aircraft of claim 4, wherein the second angle is about 45°.

6. The aircraft of claim 1, wherein the plurality of engines includes at least 4 engines and each portion of the opposed wings that rotates relative to the fuselage includes at least two engines mounted thereto.

7. The aircraft of claim 1, wherein each of the plurality of engines is an electric engine.

8. The aircraft of claim 7, further comprising a plurality of batteries, wherein each battery is mounted to one of the opposed wings adjacent to one of the plurality of engines.

9. The aircraft of claim 1, wherein each of the plurality of engines is any of a turbine and an internal combustion engine.

10. The aircraft of claim 1, wherein each of the opposed wings includes a fixed portion extending from the fuselage and a rotating portion outboard of the fixed portion.

11. The aircraft of claim 10, wherein an outboard end of each fixed portion is oblique to the longitudinal axis of the fuselage.

12. The aircraft of claim 10, wherein, in the first configuration, an axis between a leading edge and a trailing edge of the wing is parallel to the longitudinal axis of the fuselage, and in the second configuration, the axis between the leading edge and the trailing edge of the wing is perpendicular to the longitudinal axis of the fuselage.

13. The aircraft of claim 12, wherein the leading edge of each rotating portion of the opposed wings faces upward when the wings are in the second configuration.

14. The aircraft of claim 12, wherein each of the plurality of engines is offset from the wing it is mounted to such that, when each wing is in the first configuration, the at least one engine mounted thereto is disposed between the wing and the fuselage.

15. The aircraft of claim 10, wherein, in the first configuration, an axis extending between an inboard end to an outboard end of the rotating portion is perpendicular to the longitudinal axis of the fuselage, and in the second configuration, the axis extending between the inboard end and the outboard end of the rotating portion is parallel to the longitudinal axis of the fuselage.

16. The aircraft of claim 15, wherein the leading edge of each rotating portion of the opposed wings faces upward when the wings are in the second configuration.

17. The aircraft of claim 10, further comprising at least one landing support coupled to a trailing portion of each rotating portion of the opposed wings.

18. The aircraft of claim 17, wherein the landing support is any of a wheel, a float, and a leg.

19. The aircraft of claim 17, wherein the landing support is a wheel coupled to one of the engines such that the engine can rotate the wheel.

20. The aircraft of claim 10, wherein the fixed portion and the rotating portion of each of the opposed wings are coupled by a pivot joint.

21. The aircraft of claim 20, wherein the pivot joint is disposed in a leading portion of each opposed wing.

22. The aircraft of claim 10, wherein each of the opposed wings further comprises an actuator to control rotation of the rotating portion relative to the fixed portion.

23. The aircraft of claim 22, wherein the actuator includes a lead screw coupled to the rotating portion by a linkage.

24. The aircraft of claim 1, wherein the opposed wings have an airfoil shape.

25. An aircraft, comprising:
a fuselage;
opposed wings extending from opposed sides of the fuselage;
a plurality of engines, wherein at least one engine is mounted to each of the opposed wings;
wherein at least a portion of each opposed wing including at least one of the plurality of engines rotates relative to the fuselage around a rotation axis that is non-perpendicular and transverse to a longitudinal axis of the fuselage between a first configuration adapted for vertical take-off and landing, and a second configuration adapted for horizontal flight, and
wherein the wings do not produce lift in the first configuration.

26. A vertical take-off or landing method, comprising: rotating at least a portion of a wing having an engine mounted thereto relative to a fuselage around a rotation axis that is non-perpendicular and transverse to a longitudinal axis of the fuselage to orient the engine and a leading edge of the wing vertically for hovering;
actuating the engine to produce vertical lift; and
rotating the at least portion of the wing having the engine mounted thereto to orient the engine and a leading edge of the wing horizontally for forward flight.

27. The method of claim 26, wherein a leading edge of the wing faces upward when the wing is oriented vertically.

28. The method of claim 26, wherein rotating the at least portion of the wing to orient the engine and the leading edge of the wing vertically includes pivoting the at least portion of the wing about a pivot joint disposed in a leading portion of the wing.

29. The method of claim 26, wherein rotating the at least portion of the wing to orient the engine and the leading edge of the wing vertically includes any of hydraulically and electrically actuating such rotation.

30. The method of claim 26, further comprising pausing rotation of the at least portion of the wing such that the wing and the engine are between a vertical and a horizontal orientation to transition between hovering and forward flight.

* * * * *